United States Patent
Krohn et al.

(10) Patent No.: US 12,485,077 B2
(45) Date of Patent: *Dec. 2, 2025

(54) METHOD FOR DYEING KERATINOUS MATERIAL, COMPRISING THE USE OF AN ORGANOSILICON COMPOUND, AN EFFECT PIGMENT AND A POST-TREATMENT AGENT

(71) Applicant: Henkel AG & Co. KGaA, Duesseldorf (DE)

(72) Inventors: Rene Krohn, Norderstedt (DE); Thomas Hippe, Appen (DE); Stefan Hoepfner, Hamburg (DE); Jessica Brender, Hamburg (DE)

(73) Assignee: HENKEL AG & CO. KGAA, Duesseldorf (DE)

( * ) Notice: Subject to any disclaimer, the term of this patent is extended or adjusted under 35 U.S.C. 154(b) by 772 days.

This patent is subject to a terminal disclaimer.

(21) Appl. No.: 17/762,029

(22) PCT Filed: Aug. 25, 2020

(86) PCT No.: PCT/EP2020/073678
§ 371 (c)(1),
(2) Date: Mar. 18, 2022

(87) PCT Pub. No.: WO2021/052721
PCT Pub. Date: Mar. 25, 2021

(65) Prior Publication Data
US 2022/0347074 A1    Nov. 3, 2022

(30) Foreign Application Priority Data
Sep. 18, 2019 (DE) ............ 10 2019 214 204.4

(51) Int. Cl.
*A61K 8/58* (2006.01)
*A61K 8/19* (2006.01)
*A61K 8/25* (2006.01)
*A61K 8/29* (2006.01)
*A61Q 5/06* (2006.01)

(52) U.S. Cl.
CPC .......... *A61K 8/585* (2013.01); *A61K 8/19* (2013.01); *A61K 8/25* (2013.01); *A61K 8/29* (2013.01); *A61Q 5/065* (2013.01); *A61K 2800/43* (2013.01); *A61K 2800/884* (2013.01)

(58) Field of Classification Search
CPC . A61K 8/585; A61K 8/19; A61K 8/25; A61K 8/29; A61K 2800/43; A61K 2800/884; A61Q 5/065
See application file for complete search history.

(56) References Cited

U.S. PATENT DOCUMENTS

| | | | | |
|---|---|---|---|---|
| 11,504,319 B2* | 11/2022 | Lechner | ............... | A61K 8/8152 |
| 11,504,321 B2* | 11/2022 | Lechner | ............... | A61K 8/26 |
| 11,654,095 B2* | 5/2023 | Krohn | ............... | A61K 8/19 8/425 |
| 11,701,318 B2* | 7/2023 | Lechner | ............... | A61K 8/26 8/425 |
| 11,737,967 B2* | 8/2023 | Schumacher | ............... | A61K 8/585 8/425 |
| 11,744,789 B2* | 9/2023 | Lechner | ............... | A61K 8/25 8/425 |
| 11,766,390 B2* | 9/2023 | Lechner | ............... | A61Q 5/10 8/405 |
| 11,826,586 B2* | 11/2023 | Jaiser | ............... | A61K 8/44 |
| 11,883,518 B2* | 1/2024 | Krohn | ............... | A61K 8/345 |
| 11,918,665 B2* | 3/2024 | Lechner | ............... | A61K 8/894 |
| 11,938,211 B2* | 3/2024 | Lechner | ............... | A61K 8/8147 |
| 11,957,771 B2* | 4/2024 | Lechner | ............... | A61K 8/26 |
| 11,992,546 B2* | 5/2024 | Lechner | ............... | A61Q 5/065 |
| 11,998,629 B2* | 6/2024 | Krohn | ............... | A61K 8/365 |
| 12,090,222 B2* | 9/2024 | Weser | ............... | A61Q 5/08 |
| 12,201,712 B2* | 1/2025 | Weser | ............... | A61K 8/585 |
| 2010/0083446 A1* | 4/2010 | Brun | ............... | A61K 8/891 8/405 |
| 2021/0145726 A1* | 5/2021 | Herrlein | ............... | A61K 8/8147 |

FOREIGN PATENT DOCUMENTS

| | | | | |
|---|---|---|---|---|
| EP | 2168633 A2 | 3/2010 | | |
| EP | 2168633 A3 * | 3/2012 | ............... | A61K 8/31 |

OTHER PUBLICATIONS

Katie Schaefer, Synthetic Mica Pigments for Color Cosmetics, Cosmetics & Toiletries, Jun. 21, 2011 (Jun. 21, 2011), XP002800554, Internet: URL:https://www.cosmeticsandtoiletries.com.

* cited by examiner

*Primary Examiner* — Blessing M Fubara
(74) *Attorney, Agent, or Firm* — Ingrassia Fisher & Lorenz, LLP

(57) ABSTRACT

A process for dyeing keratinous material, in particular human hair, is disclosed. The process comprises applying to the keratinous material an agent (a) and an agent (b). The agent (a) comprises: (a1) at least one organosilicon compound; and (a2) at least one color-imparting compound comprising at least one effect pigment comprising (A) a substrate platelet comprising synthetic mica and (β) a coating comprising at least a first metal oxide (hydrate) layer. The agent (b) comprises (b1) at least one sealing reagent. A multi-component packaging unit (kit-of-parts) for dyeing keratinous material is also provided, and comprises separately packaged containers including the agents or components thereof for use in the process.

14 Claims, No Drawings

METHOD FOR DYEING KERATINOUS MATERIAL, COMPRISING THE USE OF AN ORGANOSILICON COMPOUND, AN EFFECT PIGMENT AND A POST-TREATMENT AGENT

CROSS-REFERENCE TO RELATED APPLICATION

This application is a U.S. National-Stage entry under 35 U.S.C. § 371 based on International Application No. PCT/EP2020/073678, filed Aug. 25, 2020, which was published under PCT Article 21(2) and which claims priority to German Application No. 102019214204.4, filed Sep. 18, 2019, which are all hereby incorporated in their entirety by reference.

TECHNICAL FIELD

The subject of the present application is a method for treating keratinous material, in particular human hair, which comprises the application of two agents (a) and (b). Agent (a) is exemplified by its content of at least one organic silicon compound (a1) and at least one selected coloring compound (a2) comprising at least one selected effect pigment. The agent (b) comprises at least one sealing reagent (b1).

A further subject of this application is a multi-component packaging unit (kit-of-parts) for dyeing keratinous material, in particular human hair, which comprises separately prepared at least three agents (a'), (a") and (b). From the agents (a') and (a") can be used to prepare the agent (a) used in the process described above.

BACKGROUND

Changing the shape and color of keratinous fibers, especially hair, is a key area of modern cosmetics. To change the color of the hair, the professional knows various coloring systems, depending on the requirements of coloring. For permanent, intensive dyeing with good fastness properties and good gray coverage, oxidation dyes are usually used. Such colorants usually contain oxidation dye precursors, so-called developer components and coupler components, which form the actual dyes under the influence of oxidizing agents such as hydrogen peroxide among themselves. Oxidation dyes are exemplified by very long-lasting dyeing results.

When using direct dyes, already formed dyes diffuse from the colorant into the hair fiber. Compared to oxidative hair dyeing, the dyeings obtained with direct dyes have lower durability and faster washout. Dyes with direct dyes usually remain on the hair for a period of between 5 and 20 washes.

For short-term color changes on the hair and/or skin, the use of color pigments is known. Color pigments are understood to be insoluble, color-imparting substances. These are present undissolved in the form of small particles in the coloring formulation and are merely deposited externally on the hair fibers and/or skin surface. Therefore, they can usually be removed without residue by a few washes with surfactant-comprising cleaning agents. Various products of this type are available on the market under the name of hair mascara.

If the user desires particularly long-lasting colorations, the use of oxidative colorants has so far been his only option. However, despite multiple optimization attempts, an unpleasant ammonia odor or amine odor cannot be completely avoided during oxidative hair coloring. The hair damage still associated with the use of the oxidative dyes also has a detrimental effect on the user's hair.

EP 2168633 B1 deals with the task of producing long-lasting hair colorations using pigments. The paper teaches that when the combination of a pigment, an organic silicon compound, a film-forming polymer and a solvent is used on hair, it is possible to produce colorations that are particularly resistant to shampooing.

BRIEF SUMMARY

A process (method) for dyeing keratinous material, in particular human hair, is provided. The process comprises applying an agent (a) to the keratinous material, wherein the agent (a) comprises: (a1) at least one organic silicon compound selected from the group of silanes having one, two, or three silicon atoms; and (a2) at least one color-imparting compound comprising at least one effect pigment. The at least one effect pigment comprises (A) a substrate platelet comprising synthetic mica, and (β) a coating comprising at least a first metal oxide (hydrate) layer. The process also comprises applying an agent (b) to the keratinous material, wherein the agent (b) comprises (b1) at least one sealing reagent.

A multi-component packaging unit (kit-of-parts) for dyeing keratinous material is also provided. The multi-component packaging unit comprises, separately packaged, a first container comprising an agent (a'), a second container comprising an agent (a"), and a third container comprising an agent (b). With relation to the process, the agent (a') comprises the at least one organic silicon compound (a1), the agent (a") comprises the at least one color-imparting compound (a2), and the agent (b) comprises the at least one sealing reagent (b1).

DETAILED DESCRIPTION

The following detailed description is merely exemplary in nature and is not intended to limit the disclosure or the application and uses of the subject matter as described herein. Furthermore, there is no intention to be bound by any theory presented in the preceding background or the following detailed description.

Metallic luster pigments or metallic effect pigments are widely used in many fields of technology. They are used, for example, for coloring coatings, printing inks, inks, plastics, glasses ceramic products and preparations of decorative cosmetics such as nail polish. They are exemplified by their attractive angle-dependent color impression (goniochromism, e.g. iridescence) and their metallic-looking luster.

Hair with a metallic finish or metallic highlights are in trend. The metallic tone makes the hair look thicker and shinier.

Effect pigments based on metal-comprising substrate platelets have only limited stability in an aqueous agent. For example, aluminum-based effect pigments decompose comparatively rapidly in water to form hydrogen and aluminum hydroxide.

There is a need to provide hair dyes with effect pigments that on the one hand have high wash and rub fastness and on the other hand do not negatively affect hair properties such as manageability and feel. For this purpose, it would be desirable if the effect pigments used had a high covering power and could be applied to the hair in thin layers. The effect pigments used should also be stable in storage over an extended period, insensitive to corrosion in the event of prolonged contact with water.

Accordingly, the task of the present disclosure was to provide a coloring system with effect pigments that has fastness properties comparable to oxidative coloring. In particular, the wash fastness properties should be outstanding, but the use of the oxidation dye precursors normally used for this purpose should be avoided.

Surprisingly it has now been found that the task can be excellently solved if keratinous materials, in particular human hair, are colored by a process in which at least two agents (a) and (b) are applied to the keratinous materials (hair). Here, the first agent (a) comprises at least one organic silicon compound from the group of silanes with one, two or three silicon atoms, and furthermore at least one selected coloring compound (a2). In the agent (a), the organic silicon compound and the colorant compound are thus prepared together. The second agent (b) comprises at least one sealing reagent.

Using the two agents (a) and (b) in one dyeing process, keratinous material could be dyed with particularly high color intensity and high fastness properties.

A first object of the present disclosure is a method for coloring keratinous material, in particular human hair, comprising the following steps:
  Application of an agent (a) to the keratinous material, wherein the agent (a) comprises:
    (a1) at least one organic silicon compound selected from the group of silanes having one, two or three silicon atoms, and
    (a2) at least one color-imparting compound comprising at least one effect pigment, comprising α) a substrate platelet comprising synthetic mica, and β) a coating comprising at least a first metal oxide (hydrate) layer; and
  Application of an agent (b) to the keratinous material, wherein the agent (b) comprises: (b1) at least one sealing reagent.

In the work leading to the present disclosure, it has been found that the preferential successive application of agents (a) and (b) enables the production of very stable and washfast colorations on the keratinous materials. Without being limited to this theory, it is suspected in this context that the joint application of organic silicon compound (a1) and color-imparting compound (a2) leads to the formation of a particularly resistant first film on the keratinous material. Application of the second agent (b) seals the coloration applied to the keratinous material, making it more resistant to washing and/or abrasion. In this way, the selected colorant compounds (a2) were permanently fixed to the keratinous material, so that extremely washfast effect colorations with good resistance to shampooing could be obtained.

The use of synthetic mica (fluorphlogopite) has several advantages over the traditional natural mica flakes often used in effect pigments. Thus, substrate platelets made of synthetic mica have lower heavy metal and impurity content as natural mica. Also, substrate platelets made of synthetic mica have a smooth, uniform surface that leads to more uniform deposition of coating materials, especially metal oxide (hydrates), and thus to high color purity and reliability. Compared to effect pigments with metal-comprising substrate platelets, the effect pigments based on synthetic mica have the advantage of corrosion resistance, which leads to higher storage stability when the effect pigments are mixed with water and to more degrees of freedom in the formulation of the agent (a).

Keratinous Material

Keratinous material means hair, the skin, the nails (such as fingernails and/or toenails). Furthermore, wool, fur and feathers also fall under the definition of keratinous material. Preferably, keratinous material is understood to mean human hair, human skin and human nails, in particular fingernails and toenails. Very preferably, keratinous material is understood to mean human hair.

Agents (a) and (b)

In the process described agents (a) and (b) are applied to the keratinous material, in particular human hair. The two agents (a) and (b) are different from each other. In other words, a first object of the present disclosure is a method for treating keratinous material, in particular human hair, comprising the following steps:
  Application of an agent (a) to the keratinous material, wherein the agent (a) comprises:
    (a1) at least one organic silicon compound selected from the group of silanes having one, two or three silicon atoms, and
    (a2) at least one colorant compound comprising at least one effect pigment comprising α) a substrate platelet comprising synthetic mica, and β) a coating comprising at least a first metal oxide (hydrate) layer; and
  Application of an agent (b) to the keratinous material, wherein the agent (b) comprises: (b1) at least one sealing reagent.

Agent (a)

Preferably, the agent (a) comprises the ingredients (a1) and (a2) essential to the present disclosure in a cosmetic carrier, particularly preferably in an aqueous or aqueous-alcoholic cosmetic carrier. This cosmetic carrier can be liquid, gel or cream. Pasty, solid or powdery cosmetic carriers can also be used for the preparation of agent (a). For hair treatment, in particular hair coloring, such carriers are, for example, creams, emulsions, gels or also surfactant-comprising foaming solutions, such as shampoos, foam aerosols, foam formulations or other preparations suitable for application to the hair.

Preferably, the cosmetic carrier comprises—based on its weight—at least about 2 wt. % of water. Further preferably, the water content is above about 10 wt. %, even more preferably above 20 wt. % and particularly preferably above about 40 wt. %. The cosmetic carrier can also be aqueous-alcoholic. For the purposes of the present disclosure, aqueous-alcoholic solutions are aqueous solutions comprising about 2 to about 70 wt. % of a $C_1$-$C_4$-Alcohol, in particular ethanol or isopropanol. The compositions as contemplated herein may additionally contain further organic solvents, such as methoxybutanol, benzyl alcohol, ethyl diglycol or 1,2-propylene glycol. Preferred solvents are all water-soluble organic solvents.

Organic Silicon Compounds from the Group of Silanes (a1)

As an ingredient (a1) essential to the present disclosure, the composition (a) comprises at least one organic silicon compound from the group of silanes having one, two or three silicon atoms. Particularly preferably, the agent (a) comprises at least one organic silicon compound (a1) selected from silanes having one, two or three silicon atoms, the organic silicon compound comprising one or more hydroxyl groups and/or hydrolysable groups per molecule. These organic silicon compounds (a1) or organic silanes included in the agent (a) are reactive compounds.

Organic silicon compounds, alternatively called organo-silicon compounds, are compounds that either have a direct silicon-carbon bond (Si—C) or in which the carbon is attached to the silicon atom via oxygen, nitrogen or sulfur atoms. The organic silicon compounds of the present disclosure are compounds comprising one to three silicon atoms. Particularly preferably, the organic silicon compounds contain one or two silicon atoms.

According to the IUPAC rules, the term silane stands for a substance group of chemical compounds based on a silicon backbone and hydrogen. In organic silanes, the hydrogen atoms are wholly or partially replaced by organic groups such as (substituted) alkyl groups and/or alkoxy groups. In the organic silanes, some of the hydrogen atoms may also be replaced by hydroxy groups.

Within the scope of a particularly preferred embodiment is a method exemplified by the application of an agent (a) to the keratinous material, said agent (a) comprising at least one organic silicon compound (a1) selected from silanes having one, two or three silicon atoms, said organic silicon compound further comprising one or more hydroxyl groups or hydrolysable groups per molecule.

In the context of a very particularly preferred embodiment, a method is exemplified by the application of an agent (a) to the keratinous material, said agent (a) comprising at least one organic silicon compound (a1) selected from silanes having one, two or three silicon atoms, said organic silicon compound further comprising one or more basic chemical functions and one or more hydroxyl groups or hydrolysable groups per molecule.

This basic group or basic chemical function can be, for example, an amino group, an alkylamino group, a dialkylamino group or a trialkylamino group, which is preferably connected to a silicon atom via a linker. Preferably, the basic group is an amino group, a $C_1$-$C_6$-alkylamino group, or a di($C_1$-$C_6$)alkylamino group.

The hydrolysable group(s) is preferably a $C_1$-$C_6$-alkoxy group, in particular an ethoxy group or a methoxy group. It is preferred if the hydrolysable group is directly bonded to the silicon atom. For example, if the hydrolysable group is an ethoxy group, the organic silicon compound preferably comprises a structural unit R'R''R'''Si—O—CH$_2$—CH$_3$. The radicals R', R'' and R''' represent the three remaining free valences of the silicon atom.

A very particularly preferred method is wherein the agent (a) comprises at least one organic silicon compound selected from silanes having one, two or three silicon atoms, the organic silicon compound preferably comprising one or more basic chemical functions and one or more hydroxyl groups or hydrolysable groups per molecule.

Particularly satisfactory results were obtained when the agent (a) comprises at least one organic silicon compound (a1) of the formula (I) and/or (II). The compounds of formulae (I) and (II) are organic silicon compounds selected from silanes having one, two or three silicon atoms, wherein the organic silicon compound comprises one or more hydroxyl groups and/or hydrolysable groups per molecule.

In a further particularly preferred embodiment, the method is wherein an agent is applied to the keratinous material (or human hair), the agent (a) comprising at least one organic silicon compound (a) of formula (I) and/or (II),

where
$R_1$, $R_2$ independently represent a hydrogen atom or a $C_1$-$C_6$ alkyl group are present,
L for a linear or branched divalent $C_1$-$C_{20}$ alkyl group,
$R_3$ represents a hydrogen atom or a $C_1$-$C_6$ alkyl group is
$R_4$ for a $C_1$-$C_6$ alkyl group a, represents an integer from 1 to 3, and
b stands for the integer 3−a;

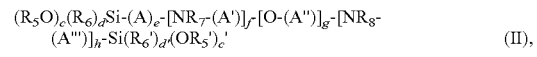

where
R5, R5', R5" independently represent a hydrogen atom or a C1-C6-alkyl group,
R6, R6' and R6" independently of one another represent a $C_1$-$C_6$ alkyl group,
A, A', A", A''' and A'''' independently of one another for a linear or branched, divalent $C_1$-$C_{20}$-alkylene group,
$R_7$ and $R_8$ independently represent a hydrogen atom, a $C_1$-$C_6$-alkyl group a hydroxy-$C_1$-$C_6$-alkyl group, a $C_2$-$C_6$ alkenyl group, an Amino-$C_1$-$C_6$-alkyl group or a group of the formula (III)

c, stands for an integer from 1 to 3,
d stands for the integer 3−c,
c' stands for an integer from 1 to 3,
d' stands for the integer 3−c',
c" stands for an integer from 1 to 3,
d" stands for the integer 3−c",
e stands for 0 or 1,
f stands for 0 or 1,
g stands for 0 or 1,
h stands for 0 or 1,
with the proviso that at least one of e, f, g and h is different from 0.

The substituents $R_1$, $R_2$, $R_3$, $R_4$, $R_5$, $R_5'$, $R_5''$, $R_6$, $R_6'$, $R_6''$, $R_7$, $R_8$, L, A, A', A", A''' and A'''' in the compounds of formula (I) and (II) are explained below by way of example: Examples for a $C_1$-$C_6$ alkyl group groups are methyl, ethyl, propyl, isopropyl, n-butyl, s-butyl and t-butyl, n-pentyl and n-hexyl. Propyl, ethyl and methyl are preferred alkyl radicals. Examples for a $C_2$-$C_6$ alkenyl group are vinyl, allyl, but-2-enyl, but-3-enyl as well as isobutenyl, preferred $C_2$-$C_6$-Alkenyl radicals are vinyl and allyl. Preferred examples of a Hydroxy-$C_1$-$C_6$-alkyl group are a hydroxymethyl, a 2-hydroxyethyl, a 2-hydroxypropyl, a 3-hydroxypropyl, a 4-hydroxybutyl, a 5-hydroxypentyl and a 6-hydroxyhexyl group; a 2-hydroxyethyl group is particularly preferred. Examples for an Amino-$C_1$-$C_6$-alkyl group are the aminomethyl group, the 2-aminoethyl group, the 3-aminopropyl group. The 2-aminoethyl group is particularly preferred. Examples of a linear divalent $C_1$-$C_{20}$ alkylene group are for example the methylene group (—CH2-), the ethylene group (—CH2-CH2-), the propylene group (—CH2-CH2-CH2-) and the butylene group (—CH2-CH2-CH2-CH2). The propylene group (—CH2-CH2-CH2-) is particularly preferred. From a chain length of 3 C atoms, divalent alkylene groups can also be branched. Examples of branched divalent $C_3$-$C_{20}$-alkylene groups are (—CH2-CH(CH3)-) and (—CH2-CH(CH3)-CH2-).

In the organic silicon compounds of formula (I)

the radicals $R_1$ and R2 independently of one another represent a hydrogen atom or a $C_1$-$C_6$ alkyl group. Very preferably, the radicals $R_1$ and R2 both represent a hydrogen atom. In the central part of the organic silicon compound is the structural unit or linker -L-which stands for a linear or branched, divalent C1-C20 alkylene group.

A divalent C1-C20 alkylene group can alternatively be expressed as a divalent or divalent C1-C20-alkylene group, by which is meant that each L grouping can form two bonds.

One bond is from the amino group R1R2N to the linker L, and the second bond is between the linker L and the silicon atom.

Preferably, -L-represents a linear, divalent (i.e., divalent) C1-C20 alkylene group. Further preferably, -L-represents a linear divalent $C_1$-$C_6$ alkylene group. Particularly preferred is -L-represents a methylene group (—CH2-), an ethylene group (—CH2-CH2-), a propylene group (—CH2-CH2-CH2-) or a butylene group (—CH2-CH2-CH2-CH2-). Very preferably, L stands for a propylene group (—CH2-CH2-CH2-). The linear propylene group (—CH2-CH2-CH2-) can alternatively be referred to as propane-1,3-diyl group.

The organic silicon compounds of formula (I)

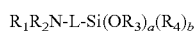     (I), each carry at one end the silicon-comprising grouping —Si(OR$_3$)$_a$(R$_4$)$_b$. In the terminal structural unit —Si(OR3)$_a$(R4)$_b$, the radical R3 is a hydrogen atom or a $C_1$-$C_6$ alkyl group, and R4 is a $C_1$-$C_6$ alkyl group. Particularly preferred are R3 and R4 independently of one another represent a methyl group or an ethyl group.

Here stands a is an integer from 1 to 3, and b is the integer 3−a. If a is the number 3, then b is 0. If a stands for the number 2, then b is equal to 1. If a is the number 1, then b is equal to 2. Particularly resistant films could be produced if the agent (a) comprises at least one organic silicon compound (a1) of the formula (I) in which the radicals $R_3$, $R_4$ independently of one another represent a methyl group or an ethyl group.

When using the process for dyeing keratinous material, dyeing with the best wash fastness could be obtained analogously when the agent (a) comprises at least one organic silicon compound of formula (I) in which the radicals $R_3$, $R_4$ independently of one another represent a methyl group or an ethyl group.

Furthermore, dyeing with the best wash fastness could be obtained when the agent (a) comprises at least one organic silicon compound of formula (I) in which the radical a stands for the number 3. In this case, the radical b stands for the number 0.

In a further preferred embodiment, the agent (a) used in the process is wherein it comprises at least one organic silicon compound (a1) of formula (I), wherein
R3, R4 independently of one another represent a methyl group or an ethyl group, and
a stands for the number 3 and
b stands for the number 0.

In a further preferred embodiment, a method is wherein the Agent (a) comprises at least one organic silicon compound (a1) of the formula (I),

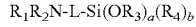     (I), where
$R_1$, $R_2$ both represent a hydrogen atom, and
L is a linear, divalent $C_1$-$C_6$ alkylene group, preferably a propylene group (—CH2-CH2-CH2-) or for an ethylene group (—CH2-CH2-), is,
R3 represents a hydrogen atom, an ethyl group or a methyl group,
R4 is a methyl group or an ethyl group,
a stands for the number 3 and
b stands for the number 0.

Organic silicon compounds of the formula (I) which are particularly suitable for solving the problem as contemplated herein are (3-Aminopropyl)triethoxysilane

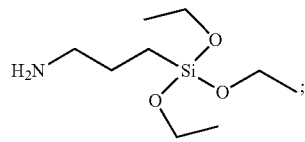

3-(Aminopropyl)trimethoxysilane

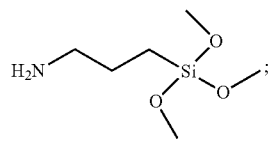

1-(3-Aminopropyl)silanetriol

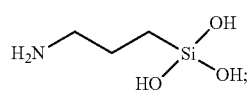

(2-Aminoethyl)triethoxysilane

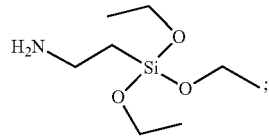

(2-Aminoethyl)trimethoxysilane

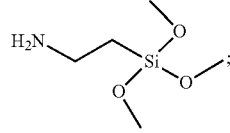

1-(2-Aminoethyl)silanetriol

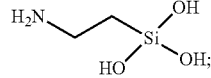

(3-Dimethylaminopropyl)trimethoxysilane

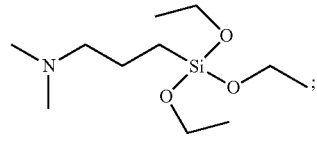 [SMILES: CCO[Si](CCCN(C)C)(OCC)OCC]

(3-Dimethylaminopropyl)triethoxysilane

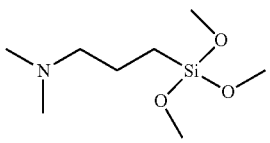

1-(3-Dimethylaminopropyl)silanetriol

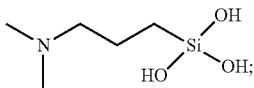

(2-dimethylaminoethyl)triethoxysilane;

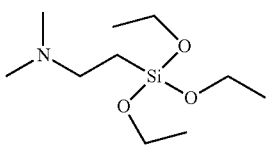

(2-Dimethylaminoethyl)trimethoxysilane

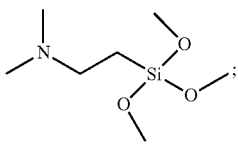

and
1-(2-dimethylaminoethyl)silanetriol

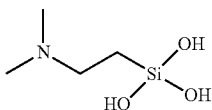

In a further preferred embodiment, a method is wherein the agent (a) comprises at least one organic silicon compound (a1) selected from the group of
(3-Aminopropyl)triethoxysilane,
(3-Aminopropyl)trimethoxysilane,
1-(3-Aminopropyl)silanetriol,
(2-Aminoethyl)triethoxysilane,
(2-Aminoethyl)trimethoxysilane,
1-(2-Aminoethyl)silanetriol,
(3-Dimethylaminopropyl)triethoxysilane,
(3-Dimethylaminopropyl)trimethoxysilane,
1-(3-Dimethylaminopropyl)silanetriol,
(2-dimethylaminoethyl)triethoxysilane,
(2-Dimethylaminoethyl)trimethoxysilane, and/or
1-(2-dimethylaminoethyl)silanetriol.

The organic silicon compounds of formula (I) are commercially available. (3-Aminopropyl)trimethoxysilane is available for purchase from Sigma-Aldrich, for example. (3-Aminopropyl)triethoxysilane is also commercially available from Sigma-Aldrich.

In a further embodiment, the composition comprises at least one organic silicon compound (a1) of the formula (II)

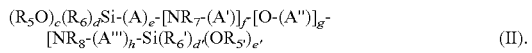

(II).

The organosilicon compounds of the formula (II) each carry at their two ends the silicon-comprising groupings $(R_5O)_c(R_6)_d Si-$ and $-Si(R_6')_{d'}(OR_5')_{c'}$.

In the middle part of the molecule of the formula (II) are the groupings $-(A)_e-$ and $-[NR_7-(A')]_f-$ and $-[O-(A'')]_g-$ and $-[NR_8-(A''')]_h-$, where each of the radicals e, f, g and h independently of one another can be the number 0 or 1, with the proviso that at least one of the radicals e, f, g and h is other than 0. In other words, an organic silicon compound (a1) of formula (II) comprises at least one grouping selected from the group of -(A)- and $-[NR_7-(A')]-$ and $-[O-(A'')]-$ and $-[NR_8-(A''')]$.

In the two terminal structural units $(R_5O)_c(R_6)_d Si-$ and $-Si(R_6')_{d'}(OR_5')_{c'}$ the radicals R5, R5', R5" independently of one another represent a hydrogen atom or a $C_1$-$C_6$ alkyl group. R6, R6' and R6" independently represent a $C_1$-$C_6$ alkyl group.

Here c stands for an integer from 1 to 3, and d stands for the integer 3−c. If c stands for the number 3, then d is 0. If c stands for the number 2, then d is equal to 1. If c stands for the number 1, then d is equal to 2.

Analogously stands c' stands for an integer from 1 to 3, and d' stands for the integer 3−c'. If c' stands for the number 3, then d' equals 0. If c' stands for the number 2, then d' is equal to 1. If c' stands for the number 1, then d' is equal to 2.

Films with the highest stability or dyes with the best wash fastness could be obtained when the radicals c and c' both stand for the number 3. In this case d and d' both stand for the number 0.

In a further preferred embodiment, a method is wherein the agent (a) comprises at least one organic silicon compound (a1) of formula (II),

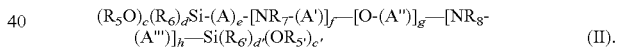

(II).

where
R5 and R5' independently of one another represent a methyl group or an ethyl group,
c and c' both stand for the number 3 and
d and d' both stand for the number 0.

If c and c' both stand for the number 3 and d and d' are both 0, the organic silicon compounds as contemplated herein correspond to formula (IIa)

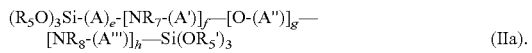

(IIa).

The radicals e, f, g, and h can independently represent the number 0 or 1, with at least one radical from e, f, g, and h being different from zero. The abbreviations e, f, g and h therefore define which of the groupings $-(A)_e-$ and $-[NR_7-(A')]_f-$ and $-[O-(A'')]_g-$ and $-[NRS-(A''')]_h-$ are in the middle part of the organic silicon compound of formula (II).

In this context, the presence of certain groupings has proven to be particularly beneficial in terms of increasing wash fastness. Particularly satisfactory results could be obtained if at least two of the radicals e, f, g and h stand for the number 1. Very preferably, e and f both stand for the number 1. Furthermore, g and h both represent the number 0. When e and f are both 1 and g and h are both 0, the organic silicon compounds as contemplated herein are represented by formula (IIb)

$$(R_5O)_c(R_6)_d Si\text{-}(A)\text{-}[NR_7\text{-}(A')]_f\text{---}Si(R_6')_{d'}(OR_5')_{c'} \quad (IIb).$$

Radicals A, A', A", A''' and A"" independently represent a linear or branched divalent $C_1$-C20-alkylene group. Preferably, the radicals A, A', A", A''' and A"" independently represent a linear, divalent $C_1$-$C_{20}$-alkylene group. Further preferably, A, A', A", A''' and A"" independently represent a linear divalent $C_1$-$C_6$ alkylene group. Particularly preferably, the radicals A, A', A", A''' and A"" independently represent a methylene group (—CH2-), an ethylene group (—CH2-CH2-), a propylene group (—CH2-CH2-CH2-) or a butylene group (—CH2-CH2-CH2-CH2-). Very preferably, the radicals A, A', A", A''' and A"" represent a propylene group (—CH2-CH2-CH2-).

The divalent C1-C20 alkylene group can alternatively be expressed as a divalent or bivalent C1-C20-Alkylene group, by which is meant that any grouping A, A', A", A''' and A"" can form two bonds.

The linear propylene group (—CH2-CH2-CH2-) can alternatively be referred to as propane-1,3-diyl group.

If the radical f represents the number 1, then the organic silicon compound of formula (II) comprises a structural grouping —[NR7-(A')], If the radical h represents the number 1, then the organic silicon compound of formula (II) comprises a structural grouping —[NR8-(A''')]-.

Here the radicals R7 and $R_8$ independently of one another represent a hydrogen atom, a C1-C6-Alkyl group, a Hydroxy-C1-C6-alkyl group, a C2-C6 alkenyl group, an Amino-C1-C6-alkyl-group or a group of the formula (III)

$$(A'''')\text{-}Si(R_6'')_{d''}(OR_5'')_{c''} \quad (III).$$

Quite preferably, the radicals R7 and R8 independently of one another represent a hydrogen atom, a methyl group, a 2-hydroxyethyl group, a 2-alkenyl group, a 2-aminoethyl group or a group of the formula (III).

If the radical f represents the number 1 and the radical h represents the number 0, the organic silicon compound comprises the grouping [NR7-(A')] but does not contain the grouping —[NR8-(A''')]. Now stands the rest R7 is a grouping of the formula (III), the agent (a) comprises an organic silicon compound with 3 reactive silane groups.

In a further preferred embodiment, a method is wherein the agent (a) comprises at least one organic silicon compound (a1) of formula (II), $$(R_5O)_c(R_6)_d Si\text{-}(A)_e\text{-}[NR_7\text{-}(A')]_f\text{---}[O\text{-}(A'')]_g\text{---}[NR_8\text{-}(A''')]_h\text{---}Si(R_6')_{d'}(OR_5')_{c'} \quad (II),$$

where
e and f both stand for the number 1,
g and h both stand for the number 0,
A and A' independently of one another represent a linear, divalent $C_1$-$C_6$ alkylene group and
R7 represents a hydrogen atom, a methyl group, a 2-hydroxyethyl group, a 2-alkenyl group, a 2-aminoethyl group or a group of formula (III).

In a further preferred embodiment, a method is wherein the agent (a) comprises at least one organic silicon compound of formula (II), wherein
e and f both stand for the number 1,
g and h both stand for the number 0,
A and A' independently of one another represent a methylene group (—CH2-), an ethylene group (—CH2-CH2-) or a propylene group (—CH2-CH2-CH2) stand, and
R7 represents a hydrogen atom, a methyl group, a 2-hydroxyethyl group, a 2-alkenyl group, a 2-aminoethyl group or a group of formula (III).

Organic silicon compounds of formula (II) which are well suited for solving the problem as contemplated herein are:

3-(Trimethoxysilyl)-N-[3-(trimethoxysilyl)propyl]-1-propanamine

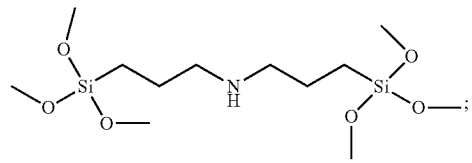

3-(Triethoxysilyl)-N-[3-(triethoxysilyl)propyl]-1-propanamine

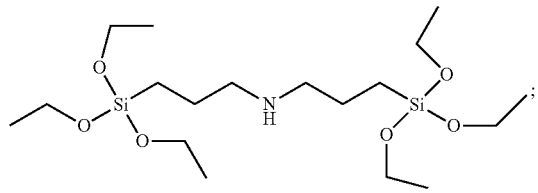 [SMILES: CCO[Si](CCCNCCC[Si](OCC)(OCC)OCC)(OCC)OCC]

N-methyl-3-(trimethoxysilyl)-N-[3-(trimethoxysilyl)propyl]-1-propanamine

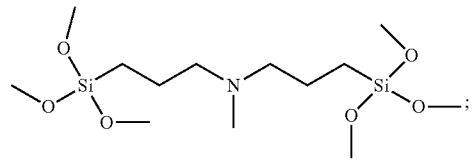

N-methyl-3-(triethoxysilyl)-N-[3-(triethoxysilyl)propyl]-1-propanamine

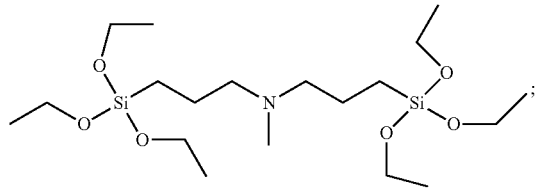 [SMILES: CCO[Si](CCCN(C)CCC[Si](OCC)(OCC)OCC)(OCC)OCC]

2-[Bis[3-(trimethoxysilyl)propyl]amino]ethanol

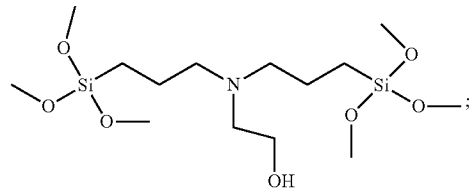

2-[Bis[3-(trimethoxysilyl)propyl]amino]ethanol

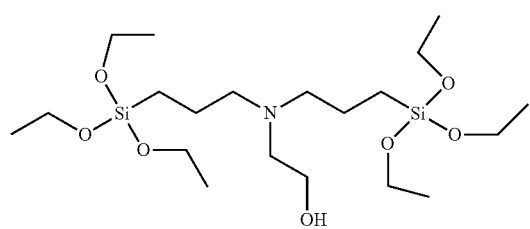 [SMILES: CCO[Si](CCCN(CCO)CCC[Si](OCC)(OCC)OCC)(OCC)OCC]

3-(Triethoxysilyl)-N,N-bis[3-(triethoxysilyl)propyl]-1-propanamine

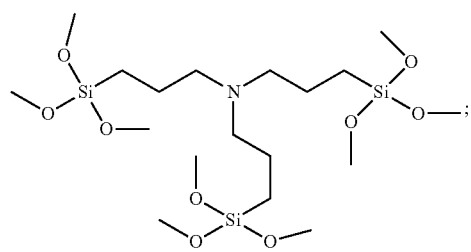

3-(Trimethoxysilyl)-N,N-bis[3-(triethoxysilyl)propyl]-1-propanamine

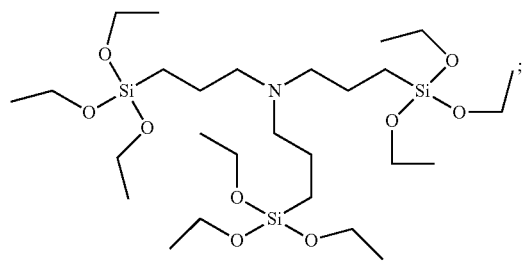 [SMILES: CCO[Si](CCCN(CCC[Si](OCC)(OCC)OCC)CCC[Si](OCC)(OCC)OCC)(OCC)OCC]

N1,N1-bis[3-(trimethoxysilyl)propyl]-1,2-ethanediamine,

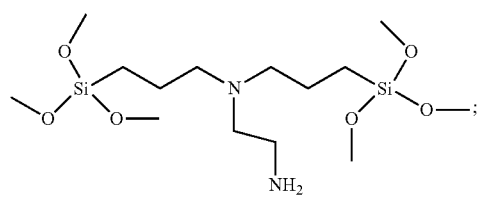

N1,N1-bis[3-(triethoxysilyl)propyl]-1,2-ethanediamine,

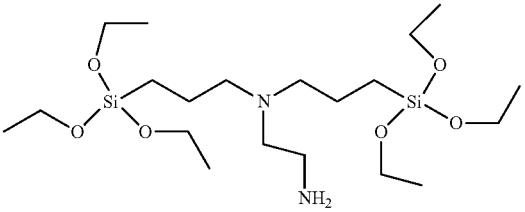 [SMILES: CCO[Si](CCCN(CCN)CCC[Si](OCC)(OCC)OCC)(OCC)OCC]

N,N-Bis[3-(trimethoxysilyl)propyl]-2-propene-1-amine

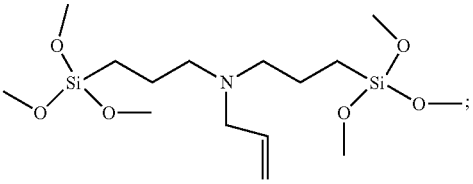

and
N,N-bis[3-(triethoxysilyl)propyl]-2-propen-1-amine

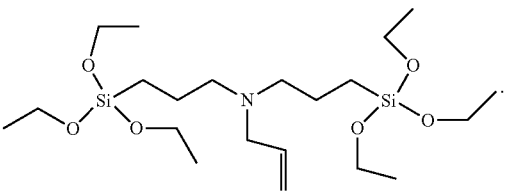 [SMILES: C=CCN(CCC[Si](OCC)(OCC)OCC)CCC[Si](OCC)(OCC)OCC]

The organic silicon compounds of formula (II) are commercially available. Bis(trimethoxysilylpropyl)amines with CAS number 82985-35-1 can be purchased from Sigma-Aldrich, for example.

Bis[3-(triethoxysilyl)propyl]amines with CAS number 13497-18-2 can be purchased, for example, from Sigma-Aldrich. N-methyl-3-(trimethoxysilyl)-N-[3-(trimethoxysilyl)propyl]-1-propanamine is alternatively known as bis(3-trimethoxysilylpropyl)-N-methylamine and can be purchased commercially from Sigma-Aldrich or Fluorochem.

3-(Triethoxysilyl)-N,N-bis[3-(triethoxysilyl)propyl]-1-propanamine with CAS number 18784-74-2 can be purchased from Fluorochem or Sigma-Aldrich, for example.

In a further preferred embodiment, a method is wherein the agent (a) comprises at least one organic silicon compound (a1) selected from the group of
3-(Trimethoxysilyl)-N-[3-(trimethoxysilyl)propyl]-1-propanamine,
3-(Triethoxysilyl)-N-[3-(triethoxysilyl)propyl]-1-propanamine,
N-methyl-3-(trimethoxysilyl)-N-[3-(trimethoxysilyl)propyl]-1-propanamine,
N-methyl-3-(triethoxysilyl)-N-[3-(triethoxysilyl)propyl]-1-propanamine,
2-[Bis[3-(trimethoxysilyl)propyl]amino]ethanol,
2-[Bis[3-(triethoxysilyl)propyl]amino]ethanol,
3-(Trimethoxysilyl)-N,N-bis[3-(trimethoxysilyl)propyl]-1-propanamine,
3-(triethoxysilyl)-N,N-bis[3-(triethoxysilyl)propyl]-1-propanamine, N1,N1-bis[3-(trimethoxysilyl)propyl]-1,2-ethanediamine,
N1,N1-bis[3-(triethoxysilyl)propyl]-1,2-ethanediamine,
N,N-bis[3-(trimethoxysilyl)propyl]-2-propen-1-amine, and/or
N,N-bis[3-(triethoxysilyl)propyl]-2-propen-1-amine.

In further tests, in particular dyeing tests, it has also been found to be particularly advantageous if the agent (a) applied to the keratinous material in the process comprises at least one organic silicon compound of the formula (IV)

  (IV).

The compounds of formula (IV) are organic silicon compounds selected from silanes having one, two or three silicon atoms, wherein the organic silicon compound comprises one or more hydroxyl groups and/or hydrolysable groups per molecule.

The organic silicon compound(s) of formula (IV) may also be referred to as silanes of the alkyl-alkoxy-silane or alkyl-hydroxy-silane type,

  (IV).

where
$R_9$ stands for a $C_1$-$C_{18}$ alkyl group,
$R_{10}$ represents a hydrogen atom or a $C_1$-$C_6$ alkyl group,
R11 represents a $C_1$-$C_6$ alkyl group
k is an integer from 1 to 3, and
m stands for the integer 3–k.

In a further preferred embodiment, the method is wherein the agent (a) comprises at least one organic silicon compound (a1) of formula (IV)

  (IV), where
$R_9$ represents a $C_1$-$C_{18}$ alkyl group,
$R_{10}$ represents a hydrogen atom or a $C_1$-$C_6$ alkyl group,
R11 is a $C_1$-$C_6$ alkyl group
k is an integer from 1 to 3, and
m is the integer 3–k.

In a further preferred embodiment, a process is wherein the agent (a) comprises, in addition to the organic silicon compound or compounds of formula (I), at least one further organic silicon compound of formula (IV)

  (IV), where
$R_9$ stands for a $C_1$-$C_{18}$-alkyl group,
$R_{10}$ represents a hydrogen atom or a $C_1$-$C_6$ alkyl group,
R11 represents a $C_1$-$C_6$ alkyl group
k is an integer from 1 to 3, and
m stands for the integer 3–k.

In a further preferred embodiment, a process is wherein the agent (a) comprises, in addition to the organic silicon compound or compounds of formula (II), at least one further organic silicon compound of formula (IV)

  (IV), where
$R_9$ stands for a $C_1$-$C_{18}$-alkyl group,
$R_{10}$ represents a hydrogen atom or a $C_1$-$C_6$ alkyl group,
R11 represents a $C_1$-$C_6$ alkyl group
k is an integer from 1 to 3, and
m stands for the integer 3–k.

In a further preferred embodiment, a process is wherein the agent (a) comprises, in addition to the organic silicon compound(s) of formula (I) and/or (II), at least one further organic silicon compound of formula (IV)

  (IV), where
$R_9$ stands for a $C_1$-$C_{18}$-alkyl group,
$R_{10}$ represents a hydrogen atom or a $C_1$-$C_6$ alkyl group,
R11 represents a $C_1$-$C_6$ alkyl group
k is an integer from 1 to 3, and
m stands for the integer 3–k.

In the organic silicon compounds of formula (IV), the radical $R_9$ represents a C1-C18-Alkyl group. This C1-C18 alkyl group is saturated and can be linear or branched. Preferably, $R_9$ represents a linear C1-C18 alkyl group. Preferably, $R_9$ represents a methyl group, an ethyl group, an n-propyl group, an n-butyl group, an n-pentyl group, an n-hexyl group, an n-octyl group, an n-dodecyl group or an n-octadecyl group. Particularly preferably, $R_9$ represents a methyl group, an ethyl group, an n-hexyl group or an n-octyl group.

In the organic silicon compounds of form (IV), the radical R10 is a hydrogen atom or a $C_1$-$C_6$ alkyl group. Particularly preferred is R10 is a methyl group or an ethyl group.

In the organic silicon compounds of form (IV), the radical R11 is a $C_1$-$C_6$ alkyl group. Particularly preferred is R11 represents a methyl group or an ethyl group.

Furthermore, k stands for an integer from 1 to 3, and m stands for the integer 3–k. If k stands for the number 3, then m is 0. If k stands for the number 2, then m is equal to 1. If k stands for the number 1, then m is equal to 2.

Particularly stable films, i.e., dyeings with particularly good wash fastness properties, could be obtained if an agent (a) comprising at least one organic silicon compound (a1) corresponding to formula (IV): in which the radical k is the number 3, was used in the process. In this case, the remainder m stands for the number 0.

Organic silicon compounds of the formula (IV) which are particularly suitable for solving the problem as contemplated herein are Methyltrimethoxysilane

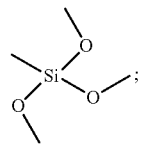

Methyltriethoxysilane

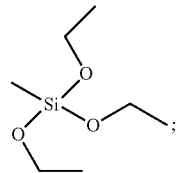

Ethyltrimethoxysilane

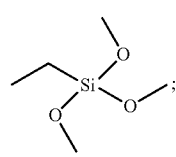

Ethyltriethoxysilane

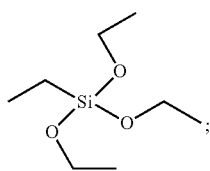

n-Hexyltrimethoxysilane

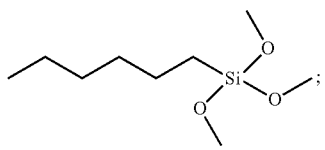

n-Hexyltriethoxysilane

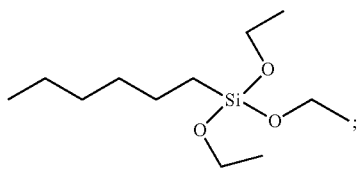 [SMILES: CCCCCC[Si](OCC)(OCC)OCC]

n-Octyltrimethoxysilane

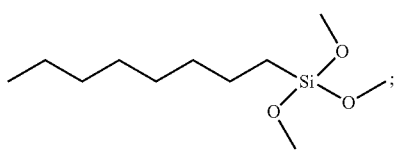

n-Octyltriethoxysilane

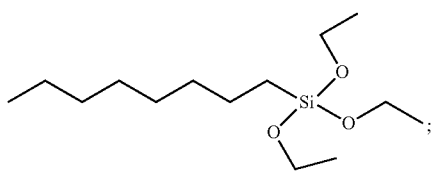 [SMILES: CCCCCCCC[Si](OCC)(OCC)OCC]

n-Dodecyltrimethoxysilane

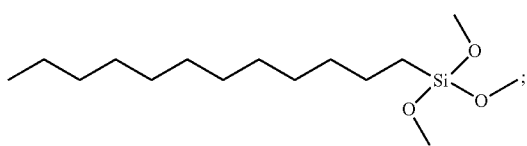 [SMILES: CCCCCCCCCCCC[Si](OC)(OC)OC]

and/or
n-Dodecyltriethoxysilane

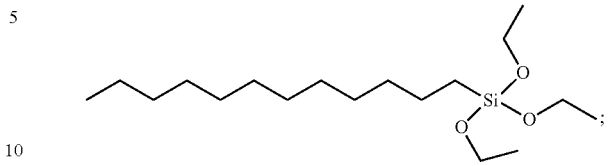

In a further preferred embodiment, a method is wherein the agent (a) comprises at least one organic silicon compound (a1) of formula (IV) selected from the group of
Methyltrimethoxysilane
Methyltriethoxysilane
Ethyltrimethoxysilane
Ethyltriethoxysilane
Propyltrimethoxysilane
Propyltriethoxysilane
Hexyltrimethoxysilane
Hexyltriethoxysilane
Octyltrimethoxysilane
Octyltriethoxysilane
Dodecyltrimethoxysilane
Dodecyltriethoxysilane
Octadecyltrimethoxysilane and/or
Octadecyltriethoxysilane.

The organic silicon compounds described above are reactive compounds. In this context, it has been found preferable if the agent (a) comprises—based on the total weight of the agent (a)—one or more organic silicon compounds (a1) in a total amount of about 0.1 to about 20 wt. %, preferably about 1 to about 15 wt. % and particularly preferably about 2 to about 8 wt. %.

In a further preferred embodiment, a process is wherein the agent (a) comprises, based on the total weight of the agent (a), one or more organic silicon compounds (a1) in a total amount of about 0.1 to about 20 wt. %, preferably about 1 to about 15 wt. % and particularly preferably about 2 to about 8 wt.

To achieve particularly good dyeing results, it is particularly advantageous to use the organic silicon compounds of formula (I) and/or (II) in certain ranges of amounts in the agent (a). Particularly preferably, the agent (a) comprises—based on the total weight of the agent (a)—one or more organic silicon compounds of the formula (I) and/or (II) in a total amount of about 0.1 to about 10 wt. %, preferably about 0.5 to about 5 wt. % and particularly preferably about 0.5 to about 3 wt. %.

In a further preferred embodiment, a process is wherein the agent (a) comprises—based on the total weight of the agent (a)—one or more organic silicon compounds of formula (I) and/or (II) in a total amount of about 0.1 to about 10 wt. %, preferably about 0.5 to about 5 wt. % and particularly preferably about 0.5 to about 3 wt. %.

Furthermore, it has been found to be particularly preferred if the organic silicon compound(s) of formula (IV) is/are also present in the agent (a) in certain ranges of amounts. Particularly preferably, the agent (a) comprises—based on the total weight of the agent (a)—one or more organic silicon compounds of the formula (IV) in a total amount of about 0.1 to about 20 wt. %, preferably about 2 to about 15 wt. % and particularly preferably about 4 to about 9 wt. %.

In a further preferred embodiment, a process is wherein the agent (a) comprises, based on the total weight of the agent (a), one or more organic silicon compounds of formula (IV) in a total amount of from about 0.1 to about 20 wt. %, preferably from about 2 to about 15 wt. % and particularly preferably about 3.2 to about 10 wt. %.

In the course of the work leading to this present disclosure, it was found that particularly stable and uniform films could be obtained on the keratinous material even when the agent (a) included two organic silicon compounds that were structurally different from each other.

In a further preferred embodiment, a method is wherein the agent (a) comprises at least two structurally different organic silicon compounds.

In a preferred embodiment, a process is wherein an agent (a) comprising at least one organic silicon compound of formula (I) and at least one organic silicon compound of formula (IV) is applied to the keratinous material.

In an explicitly very particularly preferred embodiment, a process is wherein an agent (a) is applied to the keratinous material, which agent comprises at least one organic silicon compound of formula (I) selected from the group of (3-Aminopropyl)triethoxysilane and (3-aminopropyl)trimethoxysilane, and additionally comprises at least one organic silicon compound of formula (IV) selected from the group of methyltrimethoxysilane, methyltriethoxysilane, ethyltrimethoxysilane, ethyltriethoxysilane, propyltrimethoxysilane, propyltriethoxysilane, hexyltrimethoxysilane and hexyltriethoxysilane.

In a further preferred embodiment, a method is wherein the agent (a) comprises—based on the total weight of the agent (a):
  about 0.5 to about 5 wt. % of at least one first organic silicon compound (a1) selected from the group of (3-aminopropyl)trimethoxysilane, (3-aminopropyl)triethoxysilane, (2-aminoethyl)trimethoxysilane, (2-Aminoethyl)triethoxysilane, (3-dimethylaminopropyl) trimethoxysilane, (3-dimethylaminopropyl) triethoxysilane (2-dimethylaminoethyl) trimethoxysilane and (2-dimethylaminoethyl) triethoxysilane, and
  about 3.2 to about 10 wt. % of at least one second organic silicon compound (a1) selected from the group of methyltrimethoxysilane, methyltriethoxysilane, ethyltrimethoxysilane, ethyltriethoxysilane, propyltrimethoxysilane Propyltriethoxysilane, hexyltrimethoxysilane, hexyltriethoxysilane, octyltrimethoxysilane, octyltriethoxysilane, dodecyltrimethoxysilane, dodecyltriethoxysilane, octadecyltrimethoxysilane and octadecyltriethoxysilane.

In this embodiment, the agent (a) comprises one or more organic silicon compounds of a first group in a total amount of about 0.5 to about 3 wt. %. The organic silicon compounds of this first group are selected from the group of (3-aminopropyl)trimethoxysilane, (3-aminopropyl)triethoxysilane, (2-aminoethyl)trimethoxysilane, (2-aminoethyl)triethoxysilane, (3-dimethylaminopropyl)trimethoxysilane, (3-dimethylaminopropyl)triethoxysilane (2-dimethylaminoethyl)trimethoxysilane and/or (2-dimethylaminoethyl)triethoxysilane. In this embodiment, the agent (a) comprises one or more organic silicon compounds of a second group in a total amount of 3.2 to 10 wt. %. The organic silicon compounds of this second group are selected from the group of methyltrimethoxysilane, methyltriethoxysilane, ethyltrimethoxysilane, ethyltriethoxysilane, propyltrimethoxysilane, Propyltriethoxysilane, hexyltrimethoxysilane, hexyltriethoxysilane, octyltrimethoxysilane, octyltriethoxysilane, dodecyltrimethoxysilane, dodecyltriethoxysilane, octadecyltrimethoxysilane and octadecyltriethoxysilane.

Even the addition of lesser amounts of water leads to hydrolysis in organic silicon compounds with at least one hydrolysable group. The hydrolysis products and/or organic silicon compounds having at least one hydroxy group may react with each other in a condensation reaction. For this reason, both the organosilicon compounds having at least one hydrolysable group and their hydrolysis and/or condensation products may be present in the agent (a). When organosilicon compounds having at least one hydroxyl group are used, both the organic silicon compounds having at least one hydroxyl group and their condensation products may be present in the agent (a).

A condensation product is understood to be a product formed by the reaction of at least two organic silicon compounds each having at least one hydroxyl group or hydrolysable group per molecule with elimination of water and/or with elimination of an alkanol. The condensation products can be, for example, dimers, but also trimers or oligomers, with the condensation products being in equilibrium with the monomers. Depending on the amount of water used or consumed in the hydrolysis, the equilibrium shifts from monomeric organic silicon compounds to condensation product.

Particularly satisfactory results were obtained when organic silicon compounds of formula (I) and/or (II) were used in the process. Since, as already described above, hydrolysis/condensation already starts at traces of moisture, the hydrolysis and/or condensation products of the organic silicon compounds (I) and/or (II) are also included in this embodiment.

Color-Forming Compounds (a2)

When agent (a) is applied to the keratinous material, the organic silicon compound(s) (a1) comprising one or more hydroxyl groups or hydrolysable groups per molecule are first hydrolyzed and oligomerized or polymerized in the presence of the water. The hydrolysis products or oligomers formed in this way have a particularly high affinity for the surface of the keratinous material. The simultaneous presence of the colorant compounds (a2) in the agent (a) integrates them into the resulting oligomers or polymers to form a colored film on the keratinous material. Following the application of agent (a), agent (b) is now applied, whereby the sealing reagent included in this agent (b) seals the colored film. Successive application of agents (a) and (b) produces a coloration that is particularly resistant to external influences.

As an essential component (a2) of the present disclosure, the agent (a) used in the dyeing process therefore comprises at least one color-imparting compound. The at least one colorant compound (a2) comprises at least one effect pigment comprising α) a substrate platelet comprising synthetic mica, and β) a coating comprising at least a first metal oxide (hydrate) layer.

The effect pigment has a substrate platelet comprising synthetic mica.

Synthetic mica is also known as synthetic fluorophlogopite (INCI: Synthetic Fluorophlogopite) and is preferably a fluorophlogopite of the empirical formula $KMg_3(AlSi_3)O_{10}F_2$, $KMg_2^{1/2}(Si_4O_{10})F_2$ or $NaMg_2^{1/2}(Si_4O_{10})F_2$, in preferably a fluorophlogopite of the empirical formula $KMg_3(AlSi_3)O_{10}F_2$.

In contrast to synthetically produced mica particles, natural mica particles have the disadvantage that they may contain impurities due to incorporated foreign ions. These impurities can change the hue and/or reduce the brightness L*. Typical impurities of, for example, natural mica include nickel, chromium, copper, iron, manganese, lead, cadmium, arsenic and/or antimony and/or their compounds, which can, for example, give the natural mica a coloration. The production of a synthetic mica can be controlled in a targeted manner so that the resulting synthetic mica particles have as few defects as possible. Furthermore, particle size can also be controlled and managed in the production of a synthetic mica. In addition, synthetically produced mica particles have a smooth, uniform surface that leads to more uniform deposition of materials such as metal oxide (hydrate)s, resulting in high color purity and reliability.

One advantage over effect pigments based on metal substrate platelets, in particular aluminum substrate platelets, is that synthetically produced mica particles are corrosion-resistant, especially when in contact with water.

The substrate platelet preferably has an average thickness of 50 to 1500 nm and more preferably from about 90 to about 1000 nm.

The size of the substrate platelet can be tailored to the specific application, for example the desired effect on a keratinous material. Typically, the substrate platelets have an average largest diameter of about 1 to about 200 µm, particularly about 5 to about 100 µm, and even more preferably about 5 to about 25 µm.

The substrate platelets can have different shapes. For example, lamellar or lenticular substrate platelets can be used as substrate platelets. Lamellar substrate platelets are exemplified by an irregularly structured edge and are also referred to as "cornflakes" due to their appearance. Lenticular substrate platelets have a regular round edge and are also known as "silver dollars" because of their appearance.

A coating can change the surface properties and/or optical properties of the effect pigment and increase the mechanical and chemical load-bearing capacity of the effect pigments. For example, only the upper and/or lower side of the substrate wafer may be coated, with the side surfaces being recessed. Preferably, the entire surface of the substrate platelets, including the side surfaces, is covered with the coating. The substrate platelets are preferably completely enveloped by the coating.

The coating may include one or more metal oxide (hydrate) layers. In a preferred embodiment, the coating has only a first layer. In a likewise preferred embodiment, the coating has a total of at least two, preferably two or three, layers. Preferably, the coating may comprise a first metal oxide (hydrate) layer A and a second metal oxide (hydrate) layer B, wherein the second metal oxide (hydrate) layer B is different from the first metal oxide (hydrate) layer A. Preferably, the first metal oxide (hydrate) layer is located A between the second metal oxide (hydrate) layer B and the surface of the substrate wafer. It may be preferred that the coating has three layers A, B and C. In this embodiment, between the second metal oxide (hydrate) layer B and the surface of the substrate wafer is the first metal oxide (hydrate) layer A, and on the second metal oxide (hydrate) layer B is a third layer C that is different from the underlying second layer B.

It is particularly preferred that the coating comprises a first metal oxide (hydrate) layer and a second metal oxide (hydrate) layer.

Suitable materials for the at least one first metal oxide (hydrate) layer are any metal oxides or metal oxide hydrates that can be permanently applied to the substrate platelets, comprising synthetic mica. The materials should preferably be film-applicable.

In a preferred embodiment, the first metal oxide (hydrate) layer comprises a metal oxide (hydrate) selected from the group of titanium dioxide ($TiO_2$, iron oxide ($Fe_3O_4$ and/or $Fe_3O_4$), and mixtures thereof. In a very preferred embodiment, the first metal oxide (hydrate) layer comprises titanium dioxide ($TiO_2$) and/or iron oxide ($Fe_3O_4$). In a highly preferred embodiment, the first metal oxide (hydrate) layer comprises titanium dioxide ($TiO_2$). Preferably, the entire surface of the substrate platelets, including the side surfaces, is coated by the at least one first metal oxide (hydrate) layer.

The at least one first metal oxide (hydrate) layer can be prepared, for example, wet-chemically using a metal alkoxide, titanium alkoxide such as titanium tetraethylate (tetraethyl orthotitanate) or titanium tetraisopropanolate (tetraisopropyl orthotitanate).

Alternatively, the at least one first metal oxide (hydrate) layer can be produced, for example, by hydrolytic decomposition of one or more organic metal compounds and/or by precipitation of one or more dissolved metal salts, as well as any subsequent post-treatment (for example, transferring a formed hydroxide-comprising layer to the oxide layers by annealing).

The second metal oxide (hydrate) layer, if present, is different from the first metal oxide (hydrate) layer.

Metal oxides (hydrates) suitable for the second metal oxide (hydrate) layer are tin oxide ($SnO_2$), silicon oxide ($SiO_2$), aluminum oxide ($Al_2O_3$) and/or iron oxide ($Fe_2O_3$ and/or $Fe_3O_4$). Accordingly, it is preferred that the second metal oxide (hydrate) layer is a metal oxide (hydrate) selected from the group of tin oxide ($SnO_2$), silicon oxide ($SiO_2$), aluminum oxide ($Al_2O_3$), Iron oxide ($Fe_2O_3$ and/or $Fe_3O_4$) and mixtures thereof. It is particularly preferred that the second metal oxide (hydrate) layer is tin oxide ($SnO_2$) is present.

The second metal oxide (hydrate) layer may further comprise a selectively absorbing dye or pigment. Suitable dyes and/or pigments include, for example, carmine, ferric (III) hexacyanidoferrate (II/III), and chromium oxide green ($Cr_2O_3$).

The effect pigments may have a further layer C, which acts as a protective layer and comprises a metal oxide (hydrate) or a polymer, for example a Synthetic resin, comprises. Suitable metal oxide (hydrates) includes silicon (di)oxide, silicon oxide hydrate, aluminum oxide, aluminum oxide hydrate, zinc oxide, tin oxide, titanium dioxide, zirconium oxide, iron (III) oxide, and chromium (III) oxide. Preferred is silicon dioxide.

It is particularly preferred that the effect pigment is a substrate platelet of synthetic mica (INCI: Synthetic Fluorophlogopite) and a first metal oxide (hydrate) layer comprising titanium dioxide ($TiO_2$).

It is also preferred that the effect pigment is a substrate platelet of synthetic mica (INCI: Synthetic Fluorophlogopite) and a first metal oxide (hydrate) layer comprising iron (III) oxide ($Fe_2O_3$).

It is also preferred that the effect pigment is a substrate platelet of synthetic mica (INCI: Synthetic Fluorophlogopite), a first metal oxide (hydrate) layer comprising titanium dioxide ($TiO_2$) and iron(III) oxide ($Fe_2O_3$), and a second metal oxide (hydrate) layer comprising tin dioxide ($SnO_2$).

It is highly preferred that the effect pigment is a substrate platelet of synthetic mica (INCI: Synthetic Fluorophlogopite), a first metal oxide (hydrate) layer comprising titanium dioxide ($TiO_2$), and a second metal oxide (hydrate) layer comprising tin dioxide ($SnO_2$).

Typically, the effect pigments have an average largest diameter of about 1 to about 200 µm, particularly about 5 to about 100 µm and even more preferably about 5 to about 25 µm.

Preferably, the effect pigments have a mean particle size D50 of from about 3 to about 150 µm, preferably from about 5 to about 45 µm and particularly preferably from about 10 to about 30 µm.

Very particularly preferred effect pigments have a substrate platelet of synthetic mica (INCI: Synthetic Fluorophlogopite), a first metal oxide (hydrate) layer comprising titanium dioxide ($TiO_2$), a second metal oxide (hydrate) layer comprising tin dioxide (SnO2), and a mean particle size D50 of about 10 to about 14 µm.

Effect pigments comprising α) a substrate platelet comprising synthetic mica, and β) a coating comprising at least a first metal oxide (hydrate) layer, are available, for example, under the designation Timiron® from the Merck company or under the designation SYNCRYSTAL from the Eckart company.

The adhesion and abrasion resistance of effect pigments, comprising α) a substrate platelet comprising synthetic mica, and β) a coating comprising at least a first metal oxide (hydrate) layer, in the keratinous material can be further increased by additionally modifying the outermost layer by organic compounds such as silanes, phosphoric acid esters, titanates, borates or carboxylic acids. In this process, the organic compounds are bound to the surface of the outermost, preferably metal oxide-comprising, layer. The outermost layer denotes the layer that is spatially farthest from the substrate platelet. The organic compounds are preferably functional silane compounds that can bind to the outermost layer, which preferably comprises metal oxide.

These can be either mono- or bifunctional compounds. Examples of bifunctional organic compounds are methacryloxypropenyltrimethoxysilane, 3-methacryloxypropyltrimethoxysilane, 3-acryloxypropyltrimethoxysilane, 2-acryloxyethyltrimethoxysilane, 3-methacryloxypropyitriethoxysilane, 3-acryloxypropyltrimethoxysilane, 2-methacryloxyethyltriethoxysilane, 2-acryloxyethyltriethoxysilane, 3-methacryloxypropyltris(methoxyethoxy)silane, 3-methacryloxypropyltris(butoxyethoxy)silane, 3-methacryioxy-propyltris(propoxy)silane, 3-methacryloxypropyltris(butoxy)silane, 3-acryloxy-propyltris(methoxyethoxy)silane, 3-acryloxypropyitris(butoxyethoxy)silane, 3-acryl-oxypropyltris(butoxy)silane, vinyltrimethoxysilane, vinyltriethoxysilane, Vinylethyl-dichlorosilane, vinylmethyldiacetoxysilane, vinylmethyldichlorosilane, vinylmethyldiethoxysilane, vinyltriacetoxysilane, vinyltrichlorosilane, phenylvinyldiethoxysilane, or phenylallyldichlorosilane. Furthermore, a modification with a monofunctional silane, an alkylsilane or arylsilane, can be carried out. This has only one functional group which is covalently bonded to the surface of the effect pigment comprising β) a substrate platelet comprising synthetic mica, and β) a coating comprising at least a first metal oxide (hydrate) layer, or, if not completely covered, to the mica surface. The hydrocarbon residue of the silane points away from the pigment. Depending on the type and nature of the hydrocarbon residue of the silane, a different degree of hydrophobicity of the pigment is achieved. Examples of such silanes are hexadecyltrimethoxysilane, propyltrimethoxysilane, etc. Particularly preferably, the effect pigments are surface-modified with a monofunctional silane. Octyltrimethoxysilane, octyltriethoxysilane, hecadecyltrimethoxysilane and hecadecyltriethoxysilane are particularly preferred. Due to the changed surface properties/hydrophobization, an improvement can be achieved in terms of adhesion, abrasion resistance and alignment in the application.

It has been shown that effect pigments with such a surface modification also exhibit better compatibility with the organosilicon compounds used and/or their condensation or polymerization products.

Particularly satisfactory results were obtained when the agent (a)—based on the total weight of the agent (a)—comprises one or more effect pigments in a total amount of from about 0.01 to about 10 wt. %, preferably from about 0.1 to about 8 wt. %, further preferably from about 0.2 to about 6 wt. % and very preferably from about 0.5 to about 4.5 wt. %.

In addition to the effect pigment, the agent (a) may contain further colorant compounds (a2) selected from the group of pigments and/or direct dyes.

The use of pigments has proved to be particularly preferable in this context.

In another very particularly preferred embodiment, a process is wherein the agent (a) comprises at least one further colorant compound (a2) from the group of pigments.

Pigments within the meaning of the present disclosure are colorant compounds which have a solubility in water at 25° C. of less than 0.5 g/L, preferably less than 0.1 g/L, still more preferably less than 0.05 g/L. Water solubility, for example, can be done using the method described below: 0.5 g of the pigment is weighed out in a beaker. A stir fish is added. Then one liter of distilled water is added. This mixture is stirred on a magnetic stirrer for one hour at 25° C. heated. If undissolved components of the pigment are still visible in the mixture after this period, the solubility of the pigment is below 0.5 g/L. If the pigment-water mixture cannot be assessed visually due to the high intensity of the pigment, which may be finely dispersed, the mixture is filtered. If a portion of undissolved pigment remains on the filter paper, the solubility of the pigment is below 0.5 g/L.

Suitable pigments can be of inorganic and/or organic origin.

In a preferred embodiment, a process is wherein the agent (a) comprises at least one further colorant compound (a2) from the group comprising inorganic and/or organic pigments.

Preferred pigments are selected from synthetic or natural inorganic pigments. Inorganic pigments of natural origin can be produced, for example, from chalk, ocher, umber, green earth, burnt terra di siena or graphite. Furthermore, black pigments such as iron oxide black, colored pigments such as ultramarine or iron oxide red, and fluorescent or phosphorescent pigments can be used as inorganic pigments.

Particularly suitable are colored metal oxides, hydroxides and oxide hydrates, mixed-phase pigments, sulfur-comprising silicates, silicates, metal sulfides, complex metal cyanides, metal sulfates, chromates and/or molybdates. Particularly preferred pigments are black iron oxide (CI 77499), yellow iron oxide (CI 77492), red and brown iron oxide (CI 77491), manganese violet (CI 77742), ultramarines (sodium aluminum sulfosilicates, CI 77007, Pigment Blue 29), chromium oxide hydrate (CI77289), iron blue (ferric ferrocyanide, CI77510) and/or carmine (cochineal).

Also particularly preferred pigments are colored pearlescent pigments. These are usually mica and/or mica-based and may be coated with one or more metal oxides. Mica belongs to the layer silicates. The most important representatives of these silicates are Muscovite, Phlogopite, paragonite, biotite, lepidolite and margarite. To produce the pearlescent pigments in combination with metal oxides, the mica, muscovite or phlogopite, is coated with a metal oxide.

Accordingly, a preferred process is wherein the agent (a) comprises at least one further colorant compound (a2) from the group of pigments selected from the group of colored metal oxides, metal hydroxides, metal oxide hydrates, silicates, metal sulfides, complex metal cyanides, metal sulfates, bronze pigments and/or colored pigments based on natural mica coated with at least one metal oxide and/or a metal oxychloride.

In a further preferred embodiment, the process is wherein the agent (a) comprises at least one further colorant compound (a2) from the group of pigments selected from pigments based on natural mica which are reacted with one or more metal oxides from the group comprising titanium dioxide (CI 77891), black iron oxide (CI 77499), yellow iron oxide (CI 77492), red and/or brown iron oxide (CI 77491, CI 77499), manganese violet (CI 77742), ultramarines (sodium aluminum sulfosilicates, CI 77007, Pigment Blue 29), chromium oxide hydrate (CI 77289), chromium oxide (CI 77288) and/or iron blue (ferric ferrocyanide, CI 77510).

Other suitable pigments are based on metal oxide-coated platelet-shaped borosilicates. These are coated with tin oxide, iron oxide(s), silicon dioxide and/or titanium dioxide, for example. Such borosilicate-based pigments are available, for example, under the name MIRAGE from Eckart or Reflecks from BASF SE are available.

Examples of particularly suitable pigments are commercially available under the trade names Rona®, Colorona®, Xirona®, Dichrona® and Timiron® from Merck, Ariabel® and Unipure® from Sensient, Prestige® from Eckart Cosmetic Colors, Flamenco®, Cellini®, Cloisonne®, Duocrome®, Gemtone®, Timica®, MultiReflections, Chione from BASF SE and Sunshine® from Sunstar.

Very particularly preferred pigments with the trade name Colorona® are, for example: Colorona Copper, Merck, MICA, CI 77491 (IRON OXIDES)
  Colorona Passion Orange, Merck, Mica, CI 77491 (Iron Oxides), Alumina
  Colorona Patina Silver, Merck, MICA, CI 77499 (IRON OXIDES), CI 77891 (TITANIUM DIOXIDE)
  Colorona RY, Merck, CI 77891 (TITANIUM DIOXIDE), MICA, CI 75470 (CARMINE)
  Colorona Oriental Beige, Merck, MICA, CI 77891 (TITANIUM DIOXIDE), CI 77491 (IRON OXIDES)
  Colorona Dark Blue, Merck, MICA, TITANIUM DIOXIDE, FERRIC FERROCYANIDE
  Colorona Chameleon, Merck, CI 77491 (IRON OXIDES), MICA
  Colorona Aboriginal Amber, Merck, MICA, CI 77499 (IRON OXIDES), CI 77891 (TITANIUM DIOXIDE)
  Colorona Blackstar Blue, Merck, CI 77499 (IRON OXIDES), MICA
  Colorona Patagonian Purple, Merck, MICA, CI 77491 (IRON OXIDES), CI 77891 (TITANIUM DIOXIDE), CI 77510 (FERRIC FERROCYANIDE)
  Colorona Red Brown, Merck, MICA, CI 77491 (IRON OXIDES), CI 77891 (TITANIUM DIOXIDE) Colorona Russet, Merck, CI 77491 (TITANIUM DIOXIDE), MICA, CI 77891 (IRON OXIDES)
  Colorona Imperial Red, Merck, MICA, TITANIUM DIOXIDE (CI 77891), D&C RED NO. 30 (CI 73360)
  Colorona Majestic Green, Merck, CI 77891 (TITANIUM DIOXIDE), MICA, CI 77288 (CHROMIUM OXIDE GREENS)
  Colorona Light Blue, Merck, MICA, TITANIUM DIOXIDE (CI 77891), FERRIC FERROCYANIDE (CI 77510)
  Colorona Red Gold, Merck, MICA, CI 77891 (TITANIUM DIOXIDE), CI 77491 (IRON OXIDES)
  Colorona Gold Plus MP 25, Merck, MICA, TITANIUM DIOXIDE (CI 77891), IRON OXIDES (CI 77491)
  Colorona Carmine Red, Merck, MICA, TITANIUM DIOXIDE, CARMINE
  Colorona Blackstar Green, Merck, MICA, CI 77499 (IRON OXIDES)
  Colorona Bordeaux, Merck, MICA, CI 77491 (IRON OXIDES)
  Colorona Bronze, Merck, MICA, CI 77491 (IRON OXIDES)
  Colorona Bronze Fine, Merck, MICA, CI 77491 (IRON OXIDES)
  Colorona Fine Gold MP 20, Merck, MICA, CI 77891 (TITANIUM DIOXIDE), CI 77491 (IRON OXIDES)
  Colorona Sienna Fine, Merck, CI 77491 (IRON OXIDES), MICA
  Colorona Sienna, Merck, MICA, CI 77491 (IRON OXIDES)
  Colorona Precious Gold, Merck, Mica, CI 77891 (Titanium dioxide), Silica, CI 77491 (Iron oxides), Tin oxide
  Colorona Sun Gold Sparkle MP 29, Merck, MICA, TITANIUM DIOXIDE, IRON OXIDES, MICA, CI 77891, CI 77491 (EU)
  Colorona Mica Black, Merck, CI 77499 (Iron oxides), Mica, CI 77891 (Titanium dioxide)
  Colorona Bright Gold, Merck, Mica, CI 77891 (Titanium dioxide), CI 77491 (Iron oxides)
  Colorona Blackstar Gold, Merck, MICA, CI 77499 (IRON OXIDES)
  Colorona SynCopper, Merck, Synthetic Fluorphlogopite (and) Iron Oxides
  Colorona SynBronze, Merck, Synthetic Fluorphlogopite (and) Iron Oxides Further particularly preferred pigments with the trade name Xirona® are, for example:
  Xirona Golden Sky, Merck, Silica, CI 77891 (Titanium Dioxide), Tin Oxide
  Xirona Caribbean Blue, Merck, Mica, CI 77891 (Titanium Dioxide), Silica, Tin Oxide
  Xirona Kiwi Rose, Merck, Silica, CI 77891 (Titanium Dioxide), Tin Oxide
  Xirona Magic Mauve, Merck, Silica, CI 77891 (Titanium Dioxide), Tin Oxide.
  Xirona Le Rouge, Merck, Iron Oxides (and) Silica In addition, particularly preferred pigments with the trade name Unipure® are, for example:
  Unipure Red LC 381 EM, Sensient CI 77491 (Iron Oxides), Silica Unipure Black LC 989 EM, Sensient, CI 77499 (Iron Oxides), Silica Unipure Yellow LC 182 EM, Sensient, CI 77492 (Iron Oxides), Silica Also particularly preferred pigments with the trade name Flamenco® are, for example: Flamenco® Summit Turquoise T30D, BASF, Titanium Dioxide (and) Mica Flamenco® Super Violet 530Z, BASF, Mica (and) Titanium Dioxide In a further embodiment, the agent (a) used in the process may also contain one or more colorant compounds (a2) from the group of organic pigments.

The organic pigments are correspondingly insoluble organic dyes or colorants, which may be selected, for example, from the group comprising nitroso-, nitro-azo-, xanthene-anthraquinone-, isoindolinone-, isoindoline-, quinacridone-, perinone-, perylene-, diketopyrrolopyorrole-, indigo-, thioindido-, dioxazine-, and/or triarylmethane compounds. Particularly suitable organic pigments are, for example, carmine, quinacridone, phthalocyanine, sorghum, blue pigments with the color index numbers CI 42090, CI 69800, CI 69825, CI 73000, CI 74100, CI 74160, yellow pigments with the color index numbers CI 11680, CI 11710, CI 15985, CI 19140, CI 20040, CI 21100, CI 21108, CI 47000, CI 47005, green pigments with Color Index numbers CI 61565, CI 61570, CI 74260, orange pigments with Color Index numbers CI 11725, CI 15510, CI 45370, CI 71105, red pigments with Color Index numbers CI 12085, CI 12120, CI 12370, CI 12420, CI 12490, CI 14700, CI 15525, CI 15580, CI 15620, CI 15630, CI 15800, CI 15850, CI 15865, CI 15880, CI 17200, CI 26100, CI 45380, CI 45410, CI 58000, CI 73360, CI 73915 and/or CI 75470 may be mentioned.

In a further particularly preferred embodiment, the process is wherein the agent (a) comprises at least one further colorant compound (a2) from the group of organic pigments selected from the group of carmine, quinacridone, phthalocyanine, sorghum, blue pigments with the color index numbers CI 42090, CI 69800, CI 69825, CI 73000, CI 74100, CI 74160, yellow pigments with the color index numbers CI 11680, CI 11710, CI 15985, CI 19140, CI 20040, CI 21100, CI 21108, CI 47000, CI 47005, green pigments with the Color Index numbers CI 61565, CI 61570, CI 74260, orange pigments with the Color Index numbers CI 11725, CI 15510, CI 45370, CI 71105, red pigments with the Color Index numbers CI 12085, CI 12120, CI 12370, CI 12420, CI 12490, CI 14700, CI 15525, CI 15580, CI 15620, CI 15630, CI 15800, CI 15850, CI 15865, CI 15880, CI 17200, CI 26100, CI 45380, CI 45410, CI 58000, CI 73360, CI 73915, CI 75470 and mixtures thereof.

The organic pigment can also be a colored coating. As contemplated herein, the term color varnish is understood to mean particles comprising a layer of absorbed dyes, the unit of particle and dye being insoluble under the above conditions. The particles may be, for example, inorganic substrates, which may be aluminum, silica, calcium borosilicate, calcium aluminum borosilicate, or aluminum.

Alizarin color varnish, for example, can be used as a color varnish.

Other suitable colorants (a2) from the group of pigments are inorganic and/or organic pigments modified with a polymer. The polymer modification can, for example, increase the affinity of the pigments to the respective material of the at least one layer.

Other effect pigments can also be used as a further colorant compound (a2).

The further effect pigments may include, for example, pigments based on a lamellar substrate platelet, pigments based on lenticular substrate platelets, pigments based on substrate platelets comprising "vacuum metallized pigments" (VMP). In these effect pigments, the substrate platelets comprise a metal, preferably aluminum, or an alloy. Metal substrate platelet-based effect pigments preferably have a coating which, among other things, acts as a protective layer.

Suitable additional effect pigments include, for example, the pigments Alegrace® Marvelous, Alegrace© Gorgeous or Alegrace® Aurous from Schlenk Metallic Pigments.

Other suitable effect pigments are the aluminum-based pigments of the SILVERDREAM series and the pigments of the VISIONAIRE series from Eckart, which are based on aluminum or on copper/zinc-comprising metal alloys.

Other suitable further effect pigments are based on metal oxide-coated platelet-shaped borosilicates. These are coated with tin oxide, iron oxide(s), silicon dioxide and/or titanium dioxide, for example. Such borosilicate-based pigments are available, for example, under the name MIRAGE from Eckart or Reflecks from BASF SE are available.

In a further embodiment of the process, the agent (a) may also contain one or more colorant compounds from the group of organic pigments.

In another particularly preferred embodiment, a process is wherein the composition (a) comprises at least one further coloring compound (a2) from the group of organic pigments selected from the group of carmine, quinacridone, phthalocyanine, sorghum, blue pigments having the color index numbers CI 42090, CI 69800, CI 69825, CI 73000, CI 74100, CI 74160, yellow pigments having the color index numbers CI 11680, CI 11710, CI 15985, CI 19140, CI 20040, CI 21100, CI 21108, CI 47000, CI 47005, green pigments with Color Index numbers CI 61565, CI 61570, CI 74260, orange pigments with Color Index numbers CI 11725, CI 15510, CI 45370, CI 71105, red pigments with the Color Index numbers CI 12085, CI 12120, CI 12370, CI 12420, CI 12490, CI 14700, CI 15525, CI 15580, CI 15620, CI 15630, CI 15800, CI 15850, CI 15865, CI 15880, CI 17200, CI 26100, CI 45380, CI 45410, CI 58000, CI 73360, CI 73915 and/or CI 75470.

Due to their excellent light and temperature stability, the use of the above pigments in agent (a) is particularly preferred. Furthermore, it is preferred if the pigments used have a certain particle size. On the one hand, this particle size leads to an even distribution of the pigments in the polymer film formed and, on the other hand, avoids a rough hair or skin feeling after application of the cosmetic product. It is therefore advantageous as contemplated herein if the at least one pigment has a mean particle size D50 of from about 1 to about 50 μm, preferably from about 5 to about 45 μm, preferably from about 10 to 40 μm, from about 14 to about 30 μm. The average particle size D50 can be determined, for example, using dynamic light scattering (DLS).

In a further preferred embodiment, the process is wherein the agent (a) comprises—based on the total weight of the agent (a)—one or more further coloring compound(s) (a2) in the form of pigments in a total amount of from about 0.01 to about 10 wt. %, preferably from about 0.1 to about 8 wt. %, further preferred from about 0.2 to about 6 wt. % and very preferably from about 0.5 to about 4.5 wt. %.

As further colorant compound(s) (a2), the agents (a) used in the process may also contain one or more direct dyes. Direct-acting dyes are dyes that draw directly onto the hair and do not require an oxidative process to form the color. Direct dyes are usually nitrophenylenediamines, nitroaminophenols, azo dyes, anthraquinones, triarylmethane dyes or indophenols.

The direct dyes in the sense of the present disclosure have a solubility in water (760 mmHg) at 25° C. of more than 0.5 g/L and are therefore not to be regarded as pigments. Preferably, the direct dyes in the sense of the present disclosure have a solubility in water (760 mmHg) at 25° C. of more than 1 g/L.

Direct dyes can be divided into anionic, cationic and nonionic direct dyes.

In a further preferred embodiment, the process is wherein the agent (a) comprises at least one anionic, cationic and/or nonionic direct dye as a further coloring compound (a2).

In a further preferred embodiment, the process is wherein the agent (a) comprises at least one further colorant compound (a2) selected from the group of anionic, nonionic and/or cationic direct dyes.

Suitable cationic direct dyes are, for example, Basic Blue 7, Basic Blue 26, Basic Violet 2 and Basic Violet 14, Basic Yellow 57, Basic Red 76, Basic Blue 16, Basic Blue 347 (Cationic Blue 347/Dystar), HC Blue No. 16, Basic Blue 99, Basic Brown 16, Basic Brown 17, Basic Yellow 57, Basic Yellow 87, Basic Orange 31, Basic Red 51 Basic Red 76

Examples of nonionic direct dyes that can be used are nonionic nitro and quinone dyes and neutral azo dyes. Suitable nonionic direct dyes are those available under the international designations or trade names HC Yellow 2, HC Yellow 4, HC Yellow 5, HC Yellow 6, HC Yellow 12, HC Orange 1, Disperse Orange 3, HC Red 1, HC Red 3, HC Red 10, HC Red 11, HC Red 13, HC Red BN, HC Blue 2, HC Blue 11, HC Blue 12, Disperse Blue 3, HC Violet 1, Disperse Violet 1, Disperse Violet 4, Disperse Black 9 known compounds, as well as 1,4-diamino-2-nitrobenzene, 2-amino-4-nitrophenol, 1,4-bis-(2-hydroxyethyl)amino-2-nitrobenzene, 3-nitro-4-(2-hydroxyethyl)-aminophenol, 2-(2-hydroxyethyl)amino-4,6-dinitrophenol, 4-[(2-hydroxyethyl)amino]-3-nitro-1-methylbenzene, 1-amino-4-(2-hydroxyethyl)amino-5-chloro-2-nitrobenzene, 4-amino-3-nitrophenol, 1-(2'-ureidoethyl)amino-4-nitrobenzene, 2-[(4-amino-2-nitrophenyl)amino]-benzoic acid, 6-nitro-1,2,3,4-tetrahydroquinoxaline, 2-hydroxy-1,4-naphthoquinone, picramic acid and its salts, 2-amino-6-chloro-4-nitrophenol, 4-ethylamino-3-nitrobenzoic acid and 2-chloro-6-ethylamino-4-nitrophenol.

In the course of the work leading to the present disclosure, it has been found that dyeings of particularly high color intensity can be produced with agents (a) comprising at least one anionic direct dye.

In an explicitly quite particularly preferred embodiment, the process is therefore wherein the agent (a) further comprises at least one anionic direct dye as a further colorant compound (a2).

Anionic direct dyes are also called acid dyes. Acid dyes are direct dyes comprising at least one carboxylic acid group (—COOH) and/or one sulfonic acid group (—SO3H). Depending on the pH, the protonated forms (—COOH, —SO3H) of the carboxylic acid and sulfonic acid groups are in equilibrium with their deprotonated forms (—COO$^-$, —SO$_3^-$). As pH decreases, the proportion of protonated forms increases. If direct dyes are used in the form of their salts, the carboxylic acid groups or sulfonic acid groups are present in deprotonated form and are neutralized with corresponding stoichiometric equivalents of cations to maintain electroneutrality. The acid dyes can also be used in the form of their sodium salts and/or their potassium salts.

The acid dyes according to the present disclosure have a solubility in water of (760 mmHg) at 25° C. of more than 0.5 g/L and are therefore not to be regarded as pigments. Preferably, the acid dyes in the sense of the present disclosure have a solubility in water of (760 mmHg) at 25° C. of more than 1 g/L.

The alkaline earth salts (such as calcium salts and magnesium salts) or aluminum salts of acid dyes often have poorer solubility than the corresponding alkali salts. If the solubility of these salts is below 0.5 g/L (25° C., 760 mmHg), they do not fall under the definition of a direct dye.

A key feature of acid dyes is their ability to form anionic charges, with the carboxylic or sulfonic acid groups responsible for this usually being attached to various chromophore systems. Suitable chromophore systems can be found, for example, in the structures of nitrophenylenediamines, nitroaminophenols, azo dyes, anthraquinone dyes, triarylmethane dyes, xanthene dyes, rhodamine dyes, oxazine dyes, and/or indophenol dyes.

In the context of one embodiment, a process for dyeing keratinous material is thus preferred, which is wherein the agent (a) further comprises at least one anionic direct dye as the coloring compound (a2), which is selected from the group of the nitrophenylenediamines, the nitroaminophenols, the azo dyes, the anthraquinone dyes, the triarylmethane dyes, the xanthene dyes, the rhodamine dyes, the oxazine dyes and/or the indophenol dyes, the dyes from the abovementioned group each comprising at least one carboxylic acid group (—COOH), a sodium carboxylate group (—COONa), a potassium carboxylate group (—COOK), a sulfonic acid group (—SO3H), a sodium sulfonate group (—SO$_3$Na) and/or a potassium sulfonate group (—SO3K).

For example, one or more compounds from the following group can be selected as particularly well-suited acid dyes: Acid Yellow 1 (D&C Yellow 7, Citronin A, Ext. D&C Yellow No. 7, Japan Yellow 403,CI 10316, COLIPA no. B001), Acid Yellow 3 (COLIPA no.: C 54, D&C Yellow No. 10, Quinoline Yellow, E104, Food Yellow 13), Acid Yellow 9 (CI 13015), Acid Yellow 17 (CI 18965), Acid Yellow 23 (COLIPA no. C 29, Covacap Jaune W1100 (LCW), Sicovit Tartrazine 85 E 102 (BASF), Tartrazine, Food Yellow 4, Japan Yellow 4, FD&C Yellow No. 5), Acid Yellow 36 (CI 13065), Acid Yellow 121 (CI 18690), Acid Orange 6 (CI 14270), Acid Orange 7 (2-naphthol orange, Orange II, CI 15510, D&C Orange 4, COLIPA no. C015), Acid Orange 10 (C.l. 16230; Orange G sodium salt), Acid Orange 11 (CI 45370), Acid Orange 15 (CI 50120), Acid Orange 20 (CI 14600), Acid Orange 24 (BROWN 1; CI 20170; KATSU201;nosodiumsalt;Brown No. 201;RESORCIN BROWN;ACID ORANGE 24;Japan Brown 201;D & C Brown No. 1), Acid Red 14 (C.l.14720), Acid Red 18 (E124, Red 18; CI 16255), Acid Red 27 (E 123, CI 16185, C Red 46, Real Red D, FD&C Red No. 2, Food Red 9, Naphthol Red S), Acid Red 33 (Red 33, Fuchsia Red, D&C Red 33, CI 17200), Acid Red 35 (CI C.l.18065), Acid Red 51 (CI 45430, Pyrosine B, Tetraiodofluorescein, Eosin J, Iodeosin), Acid Red 52 (CI 45100, Food Red 106, Solar Rhodamine B, Acid Rhodamine B, Red no. 106 Pontacyl Brilliant Pink), Acid Red 73 (CI 27290), Acid Red 87 (Eosin, CI 45380), Acid Red 92 (COLIPA no. C53, CI 45410), Acid Red 95 (CI 45425, Erythtosine,Simacid Erythrosine Y), Acid Red 184 (CI 15685), Acid Red 195, Acid Violet 43 (Jarocol Violet 43, Ext. D&C Violet no. 2, C.l. 60730, COLIPA no. C063), Acid Violet 49 (CI 42640), Acid Violet 50 (CI 50325), Acid Blue 1 (Patent Blue, CI 42045), Acid Blue 3 (Patent Blue V, CI 42051), Acid Blue 7 (CI 42080), Acid Blue 104 (CI 42735), Acid Blue 9 (E 133, patent blue AE, amido blue AE, erioglaucin A, CI 42090, C.l. Food Blue 2), Acid Blue 62 (CI 62045), Acid Blue 74 (E 132, CI 73015), Acid Blue 80 (CI 61585), Acid Green 3 (CI 42085, Foodgreenl), Acid Green 5 (CI 42095), Acid Green 9 (C.l.42100), Acid Green 22 (C.l.42170), Acid Green 25 (CI 61570, Japan Green 201, D&C Green No. 5), Acid Green 50 (Brilliant Acid Green BS, C.l. 44090, Acid Brilliant Green BS, E 142), Acid Black 1 (Black no. 401, Naphthalene Black 10B, Amido Black 10B, CI 20 470, COLIPA no. B15), Acid Black 52 (CI 15711), Food Yellow 8 (CI 14270), Food Blue 5, D&C Yellow 8, D&C Green 5, D&C Orange 10, D&C Orange 11, D&C Red 21, D&C Red 27, D&C Red 33, D&C Violet 2 and/or D&C Brown 1.

The water solubility of anionic direct dyes can be determined, for example, in the following way. 0.1 g of the anionic direct dye is added to a beaker. A stir fish is added. Then 100 ml of water is added. This mixture is heated to 25° C. on a magnetic stirrer while stirring. It is stirred for 60 minutes. The aqueous mixture is then visually assessed. If undissolved radicals are still present, the amount of water is increased—for example in steps of 10 ml. Water is added until the amount of dye used has completely dissolved. If the dye-water mixture cannot be assessed visually due to the high intensity of the dye, the mixture is filtered. If a proportion of undissolved dyes remains on the filter paper, the solubility test is repeated with a higher quantity of water. If 0.1 g of the anionic direct dye dissolves in 100 ml of water at 25° C., the solubility of the dye is 1 g/L. Acid Yellow 1 bears the name 8-hydroxy-5,7-dinitro-2-naphthalenesulfonic acid Disodium salt and has a solubility in water of at least 40 g/L (25° C.). Acid Yellow 3 is a mixture of the sodium salts of mono- and disulfonic acids of 2-(2-quinolyl)-1H-indene-1,3(2H)-dione and has a solubility in water of 20 g/L (25° C.). Acid Yellow 9 is the disodium salt of 8-hydroxy-5,7-dinitro-2-naphthalenesulfonic acid, its water solubility is above 40 g/L (25° C.). Acid Yellow 23 is the trisodium salt of 4,5-dihydro-5-oxo-1-(4-sulfophenyl)-4-((4-sulfophenyl)azo)-1H-pyrazole-3-carboxylic acid and is highly soluble in water at 25° C. Acid Orange 7 is the sodium salt of 4-[(2-hydroxy-1-naphthyl)azo]benzenesulfonate. Its solubility in water is more than 7 g/L (25° C.). Acid Red 18 is the trisodium salt of 7-hydroxy-8-[(E)-(4-sulfonato-1-naphthyl)-diazenyl)]-1,3-naphthalenedisulfonate and has an extremely high water solubility of more than 20 wt. %. Acid Red 33 is the disodium salt of the 5-amino-4-hydroxy-3-(phenylazo)-naphthalene-2,7-disulphonate, its solubility in water is 2.5 g/L (25° C.). Acid Red 92 is the disodium salt of 3,4,5,6-tetrachloro-2-(1,4,5,8-tetrabromo-6-hydroxy-3-oxoxanthen-9-yl)benzoic acid, whose solubility in water is reported to be greater than 10 g/L (25° C.). Acid Blue 9 is the disodium salt of 2-({4-[N-ethyl(3-sulfonatobenzyl]amino]phenyl}{4-[(N-ethyl(3-sulfonatobenzyl)imino]-2,5-cyclohexadien-1-ylidene}methyl)-benzenesulfonate and has a water solubility greater than 20 wt. % (25° C.).

A very particularly preferred process is therefore wherein the agent (a) comprises at least one further colorant compound (a2) from the group of anionic direct dyes selected from the group of Acid Yellow 1, Acid Yellow 3, Acid Yellow 9, Acid Yellow 17, Acid Yellow 23, Acid Yellow 36, Acid Yellow 121, Acid Orange 6, Acid Orange 7, Acid Orange 10, Acid Orange 11, Acid Orange 15, Acid Orange 20, Acid Orange 24, Acid Red 14, Acid Red, Acid Red 27, Acid Red 33, Acid Red 35, Acid Red 51, Acid Red 52, Acid Red 73, Acid Red 87, Acid Red 92, Acid Red 95, Acid Red 184, Acid Red 195, Acid Violet 43, Acid Violet 49, Acid Violet 50, Acid Blue 1, Acid Blue 3, Acid Blue 7, Acid Blue 104, Acid Blue 9, Acid Blue 62, Acid Blue 74, Acid Blue 80, Acid Green 3, Acid Green 5, Acid Green 9, Acid Green 22, Acid Green 25, Acid Green 50, Acid Black 1, Acid Black 52, Food Yellow 8, Food Blue 5, D&C Yellow 8, D&C Green 5, D&C Orange 10, D&C Orange 11, D&C Red 21, D&C Red 27, D&C Red 33, D&C Violet 2 and/or D&C Brown 1.

The direct dye(s), in particular the anionic direct dyes, can be used in different amounts in the agent (a) depending on the desired color intensity.

Particularly satisfactory results were obtained when the agent (a) comprises—based on its total weight—one or more direct dyes as further coloring compound (a2) in a total amount of from about 0.01 to about 10% by weight, preferably from about 0.1 to about 8 wt. %, more preferably from about 0.2 to about 6 wt. % and very particularly preferably from about 0.5 to about 4.5 wt. %.

In a further preferred embodiment, the process is wherein the agent (a)—based on the total weight of the agent (a)—further comprises one or more direct dyes as a further coloring compound (a2) in a total amount of from about 0.01 to about 10 wt. %, preferably from about 0.1 to about 8 wt. %, more preferably from about 0.2 to about 6 wt. %, and most preferably from about 0.5 to about 4.5 wt. %.

Silicone Polymers (a3)

In a further very particularly preferred embodiment, the agent (a) used in the process additionally comprises at least one silicone polymer (a3).

Silicone polymers, which can alternatively be called silicones for short, are understood to be poly(organo)siloxanes. Silicone polymers are a group of synthetic polymers in which silicon atoms are linked via oxygen atoms.

Silicone polymers are macromolecules with a molecular weight of at least about 500 g/mol, preferably at least about 1000 g/mol, more preferably at least about 2500 g/mol, particularly preferably at least about 5000 g/mol, comprising repeating organic units.

The maximum molecular weight of the silicone polymer depends on the degree of polymerization (number of polymerized monomers) and the batch size and is partly determined by the polymerization method. For the purposes of the present disclosure, it is preferred if the maximum molecular weight of the silicone polymer is not more than $10^7$ g/mol, preferably not more than $10^6$ g/mol, and particularly preferably not more than $10^5$ g/mol.

The silicone polymers comprise many Si—O repeating units, and the Si atoms may carry organic radicals such as alkyl groups or substituted alkyl groups.

Corresponding to the high molecular weight of silicone polymers, these are based on more than 10 Si—O repeating units, preferably more than 50 Si—O repeating units and more preferably more than 100 Si—O repeating units, most preferably more than 500 Si—O repeating units.

The silicone polymers (a3) included in agent (a) are therefore different from the silanes (a1) also included in agent (a).

In one preferred embodiment is thus a process for dyeing keratinous material, which is wherein the agent comprises (a):

(a3) at least one silicone polymer.

In the work leading to the present disclosure, it was found that incorporation of the silicone polymer (a3) into the agent (a) resulted in an improvement in hair feel.

The film produced by the oligomerization or polymerization of the organosilicon compounds (silanes) (a1) may exhibit a certain stickiness or even softness, especially when higher amounts of silanes (a1) are used, which may have a detrimental effect on the feel of the keratinic materials on the one hand and on the durability of the film on the other. Without being committed to this theory, it is believed that the joint application of the silane (a1) and the silicone polymer (a3) in the medium (a) leads to a reaction or interaction of the two components with each other. When silane and silicone polymer are used together, the silanes form a film, as previously described, into which the silicone polymers are either incorporated, or to which the silicone polymers agglomerate. It has been found that the film formed in this way is much more supple, flexible, durable and less brittle.

Accordingly, it was observed that the rheological properties of the film produced by agent (a) could be improved by the addition of at least one silicone polymer (a3). In the presence of the silicone polymers (a3), the film became firmer or more rigid, leaving the colored keratinous materials with a less sticky, smoother, and more pleasing appearance. Furthermore, the higher strength of the film also had positive effects on the fastness properties of the keratinic materials, especially on their rub fastness properties. Since the dyed films were more resistant when in contact with combs, brushes and textiles, they showed less abrasion when in contact with these items.

When certain silicone polymers (a3) were used, the advantages described above were particularly pronounced. It has therefore been found to be particularly preferred if the agent (a) used in the process comprises at least one alkoxy-modified silicone polymer and/or at least one amino-modified silicone polymer (a3).

In the context of one embodiment, a method for dyeing keratinous material is thus preferred, which is wherein the agent comprises (a):

(a3) at least one alkoxy-modified and/or amino-modified silicone polymer.

In a further preferred embodiment, a method is wherein the agent (a) comprises at least one alkoxy-modified silicone polymer.

Alkoxy-modified silicones are silicones whose structure includes at least one structural alkoxy unit. This structural alkoxy unit can be, for example, an alkoxy group. Alkoxy groups are $C_2$-$C_{10}$ alkoxy groups are understood. The alkoxy group may be terminal to the silicone (i.e., for example, as the group —O—$CH_3$ or as group —O—$CH_2$—$CH_3$ are present). However, it is equally as contemplated herein if the alkoxy group itself still carries a substituent; in this case, an alkoxy modification is understood to be at least one grouping located on the silicone such as, for example, (—CH2-CH2-O—), (—CH2-CH2-CH2-O—), (—CH(CH3)-CH2-O—), (—CH2-CH(CH3)-CH2-O—) or (—CH2-CH2-CH2-CH2-O—). Preferably, the alkoxy-modified silicones (A) carry at least one grouping (—CH2-CH2-O—) and/or (—CH2-CH2-CH2-O—).

The alkoxy groups may be linked to the silicone either via a carbon atom or via an oxygen atom, for example, the silicones may bear the structural units of the formula (S-a), (S-b), (S-c) and/or (S-d):

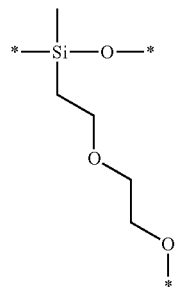

(Si-a)

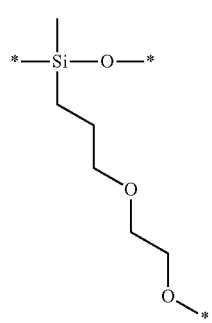

(Si-b)

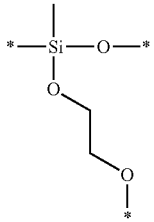

(Si-c)

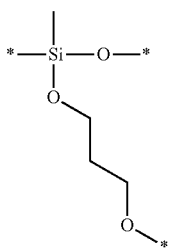

(Si-d)

It is particularly preferred if the alkoxy-modified silicone polymer(s) (a3) carry more than one alkoxy group, i.e., if the silicone polymers (a3) are polyalkoxylated. Polyalkoxylated silicones carry as structural units polyoxyalkylene groups, polyoxyethylene groups (i.e., groups of the type [—CH2-CH2-O-]$_m$) and/or polyoxypropylene groups (i.e., groups of the type [—CH(CH3)-CH2-O-]$_m$ and/or [—CH2-CH2-CH2-O-]$_m$). Preferably, the number of polyoxyalkylene units in the silicone polymer is at least 2. Therefore, m is an integer greater than or equal to 2.

Particularly preferably, the alkoxy-modified silicone (a3) is a nonionic silicone. Non-ionic silicones carry neither positive nor negative charges. Very particularly suitable polyalkoxylated silicones (a3) comprise at least one structural unit of the formula (S-I)

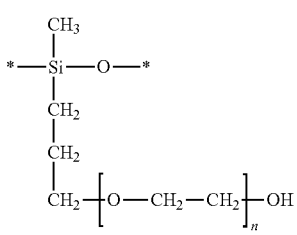

(S-I)

wherein n is an integer from about 2 to about 20, preferably an integer from 4 to 18, more preferably an integer from 6 to 16, still more preferably an integer from 8 to 14, and most preferably the number 12.

The positions marked with an asterisk * in the above formulas represent the free valences of the corresponding bonds, whereby the bond can be to a further Si atom, a further O atom and/or a further C atom.

In the context of one embodiment, a process for dyeing keratinous material is thus preferred, which is wherein the agent comprises (a):

(a3) at least one silicone polymer comprising at least one structural unit of the formula (S-I)

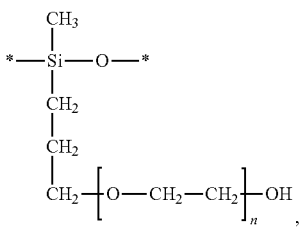

(S-I)

wherein
n is an integer from 2 to 20, preferably an integer from 4 to 18, more preferably an integer from 6 to 16, still more preferably an integer from 8 to 14, and most preferably the number 12.

A preferred alkoxy-modified silicone polymer (a3) may contain, in addition to one or more structural units of the general formula (S-I), further structural units that differ structurally from the units of formula (S-I). Particularly preferably, the alkoxy-modified silicone polymer additionally comprises one or more dimethylsiloxane units. Depending on whether the silicone is linear or branched, it has two (in the case of a chain linear silicone) or more (in the case of a branched silicone) end groups. It has been found to be particularly advantageous if a silicone polymer (a3) has a trimethylsilyloxy group (i.e., a group —O—Si(CH$_3$)$_3$) as end groups in each case.

In a further particularly preferred embodiment, the process is therefore wherein the agent (a) comprises at least one silicone polymer (a3) which is composed of Structural units of the formula (S-I), the formula (S-II), the formula (S-III) and the formula (S-IV),

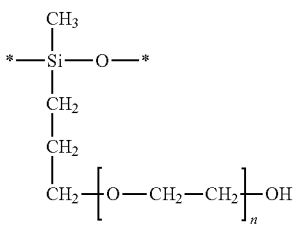

(S-I)

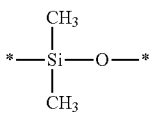

(S-II)

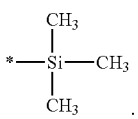

(S-III)

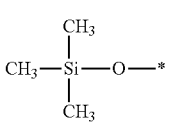

(S-IV)

wherein n—independently in each structural unit (S-I)—represents in each case an integer from 2 to 20, preferably an integer from 4 to 18, more preferably an integer from 6 to 16, still more preferably an integer from 8 to 14, and most preferably the number 12.

A silicone polymer (a3) composed of structural units of the formula (S-I), the formula (S-II), the formula (S-Ill) and the formula (S-IV) is understood in this context to mean a silicone which exclusively possesses (in each case one or more) structural units of the formulae (S-I), (S-II), (S-Ill) and (S-IV). The silicone may also contain different structural units of the formula (S-I), each of which is distinguished by its number n.

The positions marked with an asterisk in the structural units each represent the linkage points to the other structural units. For example, a particularly preferred silicone polymer (a3) which is composed of structural units of the formula (S-I), of the formula (S-II), of the formula (S-III) and of the formula (S-IV), which have the following structure:

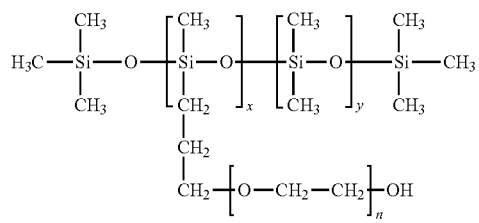

x and y are chosen here depending on the desired molecular weight of the silicone, and n represents one of the preferred or particularly preferred integers described above as contemplated herein.

Both low molecular weight and higher molecular weight alkoxy-modified silicones can be used as silicone polymers (a3). Particularly beneficial effects were observed for silicone polymers (a3) with a molar mass of about 800 to about 10,000 g/mol, preferably of about 1,000 to about 9,000 g/mol, further preferably of about 2,000 to about 8,000 g/mol and especially preferably of about 2,500 to about 5,000 g/mol. Particularly well-suited silicone polymers include:

Abil B 8843 from Evonik, PEG-14 DIMETHICONE
Xiameter OFX 0193 Fluid from Dow Corning, PEG-12 Dimethicone Furthermore, particularly satisfactory results were also obtained when an agent (a) comprising an amino-modified silicone polymer (a3) was used in the process. The amino-modified silicone polymer may alternatively be referred to as an amino-functionalized silicone polymer or also as an aminosilicone.

In a further preferred embodiment, a method is wherein the agent (a) comprises at least one amino-modified silicone polymer.

Agent (a) may contain one or more different amino-modified silicone polymers (a3). Such silicones can be exemplified, for example, by the formula (S-V)

$$M(R_aQ_bSiO_{(4-a-b)/2})_x(R_cSiO_{(4-c)/2})_yM \qquad (S\text{-}V)$$

in which formula R is a hydrocarbon or a hydrocarbon radical having from 1 to about 6 carbon atoms, Q is a polar radical of the general formula R$^1$HZ wherein R$^1$ is a divalent linking group bonded to hydrogen and the radical Z, composed of carbon and hydrogen atoms, carbon, hydrogen and oxygen atoms, or carbon, hydrogen and nitrogen atoms, and Z is an organic amino functional radical comprising at least one amino functional group; "a" takes values ranging from about 0 to about 2, "b" takes values ranging from about 1 to about 3, "a"+"b" is less than or equal to 3, and "c" is a number ranging from about 1 to about 3, and x is a number ranging from 1 to about 2,000, preferably from about 3 to about 50 and most preferably from about 3 to about 25, and y is a number in the range of from about 20 to about 10,000, preferably from about 125 to about 10,000 and most preferably from about 150 to about 1,000, and M is a suitable silicone end group as known in the prior art, preferably trimethylsiloxy.

Non-limiting examples of radicals represented by R include alkyl radicals, such as methyl, ethyl, propyl, isopropyl, isopropyl, butyl, isobutyl, amyl, isoamyl, hexyl, isohexyl and the like; alkenyl radicals, such as vinyl, halovinyl, alkylvinyl, allyl, haloallyl, alkylallyl; cycloalkyl radicals, such as cyclobutyl, cyclopentyl, cyclohexyl and the like; Phenyl radicals, benzyl radicals, halohydrocarbon radicals, such as 3-chloropropyl, 4-bromobutyl, 3,3,3-trifluoropropyl, chlorocyclohexyl, bromophenyl, chlorophenyl, and the like; and sulfur-comprising radicals, such as mercaptoethyl, mercaptopropyl, mercaptohexyl, mercaptophenyl, and the like; preferably R is an alkyl radical comprising from 1 to about 6 carbon atoms, and most preferably R is methyl. Examples of $R^1$ include methylene, ethylene, propylene, hexamethylene, decamethylene, —CH$_2$CH(CH$_3$)CH$_2$—, phenylene, naphthylene, —CH2CH2SCH2CH2-, —CH2CH2OCH2-, —OCH2CH2-, —OCH2 CH2CH2-, —CH2CH(CH3)C(O) OCH2-, —(CH$_2$)$_3$ CC(O)OCH2CH2-, —C6H 4C6H4-, —C6H 4CH2C6H4-; and —(CH$_2$)$_3$C(O)SCH$_2$CH$_2$—.

Z is an organic amino functional residue comprising at least one amino functional group. A formula for Z is NH(CH2)$_z$NH2 wherein z is 1 or more. Another formula for Z is —NH(CH2) z (CH 2)$_{zz}$NH, wherein both z and zz are independently 1 or more, said structure comprising diamino ring structures, such as piperazinyl. Z is most preferentially a —NHCH2CH 2NH2- radical. Another formula for Z is —N(CH2)$_z$(CH2)$_{zz}$NX2 or —NX2 where each X of X2 is independently selected from the group of hydrogen and alkyl groups having 1 to 12 carbon atoms, and zz is 0.

Q is most preferably a polar, amine functional radical of the formula —CH2CH2CH2NHCH2CH2NH2. In the formulas, "a" takes values ranging from about 0 to about 2, "b" takes values ranging from about 2 to about 3, "a"+"b" is less than or equal to 3, and "c" is a number ranging from about 1 to about 3. The molar ratio of $R_aQ_b$ SiO$_{(4-a-b)/2}$ units to $R_c$SiO$_{(4-c)/2}$ units is in the range of about 1:2 to 1:65, preferably of about 1:5 to about 1:65 and most preferably by about 1:15 to about 1:20. If one or more silicones of the above formula are used, then the various variable substituents in the above formula may be different for the various silicone components present in the silicone blend.

In a particularly preferred embodiment, a method is exemplified by the application of an agent (a) to the keratinous material, wherein the agent (a) is an amino-modified silicone polymer (a3) of the formula (S-VI)

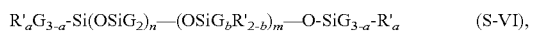    (S-VI), comprises, wherein agent:
G is-H, a phenyl group, —OH, —O—CH$_3$, —CH$_3$, —O—CH$_2$CH$_3$, —CH$_2$CH$_3$, —O—CH$_2$CH$_2$CH$_3$, —CH$_2$CH$_2$CH$_3$, —O—CH(CH$_3$)$_2$, —CH(CH$_3$)$_2$, —O—CH$_2$CH$_2$CH$_2$CH$_3$, —CH$_2$CH$_2$CH$_2$CH$_3$, —O—CH$_2$CH(CH$_3$)$_2$, —CH$_2$CH(CH$_3$)$_2$, —O—CH(CH$_3$)CH$_2$CH$_3$, —CH(CH$_3$)CH$_2$CH$_3$, —O—C(CH$_3$)$_3$, —C(CH$_3$)$_3$;
a represents a number between 0 and 3, particularly 0;
b represents a number between 0 and 1, particularly 1,
m and n are numbers whose sum (m+n) is between 1 and 2000, preferably between 50 and 150, where n preferably assumes values from 0 to 1999 and from 49 to 149 and m preferably assumes values from 1 to 2000, from 1 to 10,
R' is a monovalent radical selected from
-Q-N(R")—CH$_2$—CH$_2$—N(R")$_2$
-Q-N(R")$_2$
-Q-N$^+$(R")$_3$A-
-Q-N$^+$H(R")$_2$A-
-Q-N$^+$H$_2$(R")A-
-Q-N(R")—CH$_2$—CH$_2$—N$^+$R"H$_2$A-,
where each Q is a chemical bond, —CH$_2$—, —CH$_2$—CH$_2$—, —CH$_2$CH$_2$CH$_2$—, —C(CH$_3$)$_2$—, —CH$_2$CH$_2$CH$_2$CH$_2$—, —CH$_2$C(CH$_3$)$_2$—, —CH(CH$_3$) CH$_2$CH$_2$—,
R" represents identical or different radicals from the group comprising —H, -phenyl, -benzyl, —CH$_2$—CH(CH$_3$) Ph, the C1-C20 alkyl radicals, preferably —CH$_3$, —CH$_2$CH$_3$, —CH$_2$CH$_2$CH$_3$, —CH(CH$_3$)$_2$, —CH$_2$CH$_2$CH$_2$H$_3$, —CH$_2$CH(CH$_3$)$_2$, —CH(CH$_3$) CH$_2$CH$_3$, —C(CH$_3$)$_3$, and
A represents an anion which is preferably selected from chloride, bromide, iodide or methosulfate.

In a further preferred embodiment, a method is exemplified by applying an agent (a) to the keratinous material, wherein the agent (a) comprises at least one amino-modified silicone polymer (a3) of formula (S-VII),

    (S-VII), wherein m and n are numbers whose sum (m+n) is between about 1 and about 2000, preferably between about 50 and about 150, n preferably assuming values from 0 to 1999 and from 49 to 149, and m preferably assuming values from 1 to 2000, from 1 to 10.

According to the INCI declaration, these silicones are called trimethylsilylamodimethicones.

In a further preferred embodiment, a method is exemplified by the application of an agent (a) to the keratinous material, wherein the agent (a) comprises at least one amino-modified silicone polymer (a3) of formula (S-VIII)

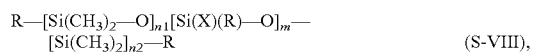    (S-VIII),

where R is —OH, —O—CH$_3$ or a —CH$_3$ group and m, n1 and n2 Are numbers whose sum is (m+n1+n2) between 1 and about 2000, preferably between about 50 and about 150 where the sum (n1+n2) preferably has values of 0 to 1999 and from 49 to 149 and m preferably values of 1 to 2000, from 1 to 10 assumes.

According to the INCI declaration, these amino-modified or amino-functionalized silicone polymers are known as amodimethicones.

Regardless of which amino-modified silicones are used, agents (a) comprising an amino-modified silicone polymer whose amine number is above 0.25 meq/g, preferably above 0.3 meq/g and above 0.4 meq/g, are preferred. The amine number represents the milliequivalents of amine per gram of the amino-functional silicone. It can be determined by titration and expressed in the unit mg KOH/g.

In a further preferred embodiment, a method is exemplified by applying an agent (a) to the keratinous material, wherein the agent (a) comprises at least one amino-modified silicone polymer (a3) of the formula of formula (S-IX),

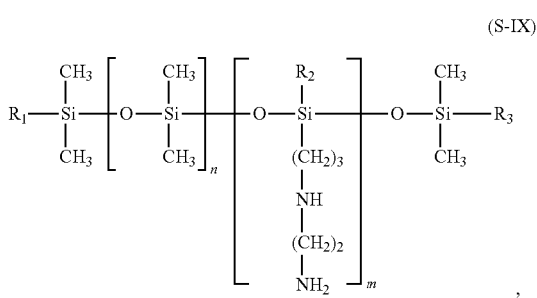

(S-IX)

where
m and n are numbers chosen so that the sum (n+m) is in the range from 1 to 1000,
n is a number in the range 0 to 999 and m is a number in the range 1 to 1000,
R1, R2 and R3, which are the same or different, denote a hydroxy group or a C1-4-alkoxy group,
where at least one of the groups R1 to R3 denotes a hydroxy group.

Other preferred methods are exemplified by the application of an agent (a) to the keratinous material, said agent (a) comprising at least amino-functional silicone polymer of the formula of the formula (S-X)

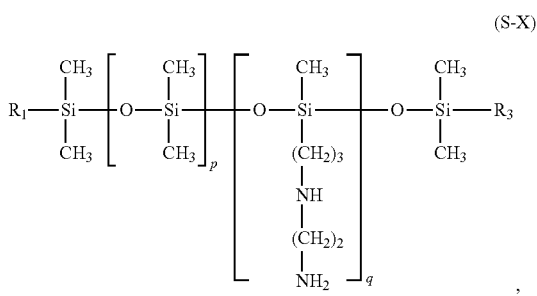

(S-X)

where
p and q mean numbers chosen so that the sum (p+q) is in the range 1 to 1000,
p is a number in the range 0 to 999 and q is a number in the range 1 to 1000,
R1 and R2, which are different, denote a hydroxy group or a C1-4 alkoxy group, at least one of the groups R1 to R2 represents a hydroxy group.

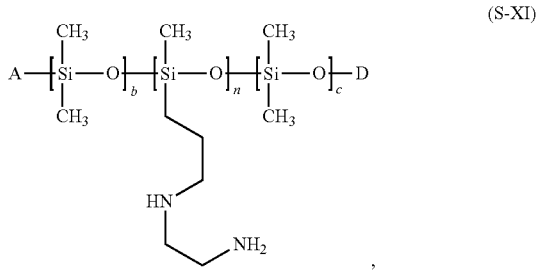

(S-XI)

A represents a group —OH, —O—Si(CH$_3$)$_3$, —O—Si(CH$_3$)$_{20}$H, —O—Si(CH$_3$)$_{20}$CH$_3$,
D represents a group —H, —Si(CH$_3$)$_3$, —Si(CH$_3$)$_{20}$H, —Si(CH$_3$)$_{20}$CH$_3$, b, n and c are integers between 0 and 1000, with the following conditions
n>0 and b+c>0
at least one of the conditions A=—OH or D=—H is fulfilled.

In the above formula (S-XI), the individual siloxane units are statistically distributed with the indices b, c and n, i.e., they do not necessarily have to be block copolymers.

The silicones of the formulas (S-IX) and (S-X) differ in the grouping at the Si atom carrying the nitrogen-comprising group: In formula (S-IX), R2 represents a hydroxy group or a C1-4 alkoxy group, while the residue in formula (S-X) is a methyl group. The individual Si-Groupings marked with the indices m and n or p and q do not have to be present as blocks, the individual units can also be present in a statistically distributed manner, i.e., in the formulas (S-IX) and (S-X) not necessarily every R1-Si(CH$_3$)$_2$ group to a —[O—Si(CH$_3$)$_2$]—Grouping.

Processes in which an agent (a) comprising at least one amino-modified silicone polymer (a3) of the formula of the formula (S-XI) is applied to the keratin fibers have also proved to be particularly effective with respect to the desired effects.

Particularly beneficial effects regarding the improvement of rub fastness were observed when an agent (a) comprising a special 4-morpholinomethyl-substituted silicone polymer (a3) was applied to the keratinous material in the procedures. This very particularly preferred amino-functionalized silicone polymer comprises at least one structural unit of the formula (S-XIII)

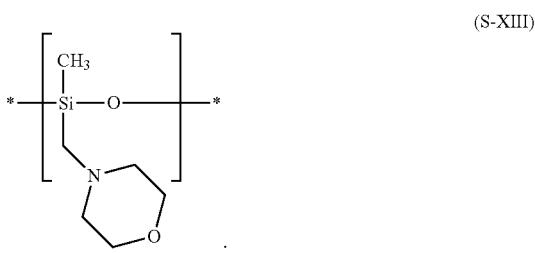

(S-XIII)

Within the scope of an embodiment a process for dyeing keratinous material is thus preferred, which is wherein the agent comprises (a):
(a3) at least one silicone polymer comprising at least one structural unit of the formula (S-XIII)

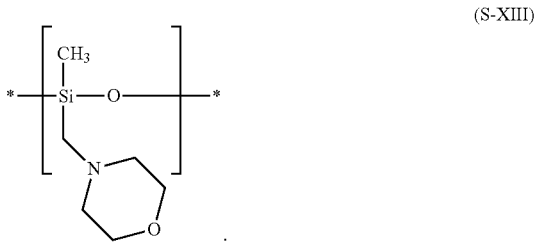

(S-XIII)

Particularly beneficial effects in terms of improving rub fastness were also observed when an agent (a) comprising a special 4-morpholinomethyl-substituted silicone polymer (a3) was applied to the keratinous material in the procedures. This very particularly preferred amino-functionalized silicone polymer comprises structural units of the formulae (S-XII) and of the formula (S-XIII)

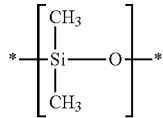
(S-XII)

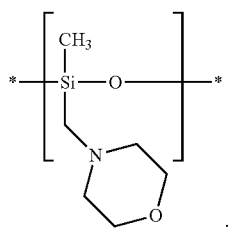
(S-XIII)

In an explicitly very particularly preferred embodiment, a process is wherein the agent (a) comprises at least one amino-modified silicone polymer (a3) comprising structural units of the formula (S-XII) and of the formula (S-XIII)

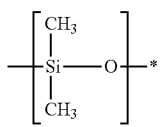
(S-XII)

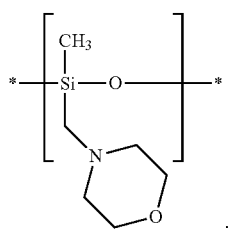
(S-XIII)

Corresponding 4-morpholinomethyl-substituted silicone polymers are described below.

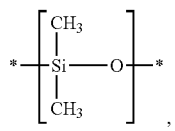
(S-XII)

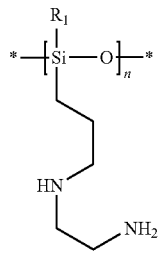
(S-XIV')

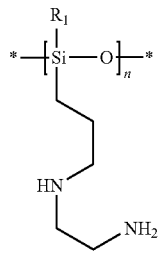
(S-XIII')

In which
R1 stands for —CH$_3$, —OH, —OCH$_3$, —O—CH$_2$CH$_3$, —O—CH$_2$CH$_2$CH$_3$, or —O—CH(CH$_3$)$_2$ is
R2 stands for —CH$_3$, —OH, or —OCH$_3$.

Particularly preferred agents (a) contain at least one 4-morpholinomethyl-substituted silicone of the formula (S-XV)

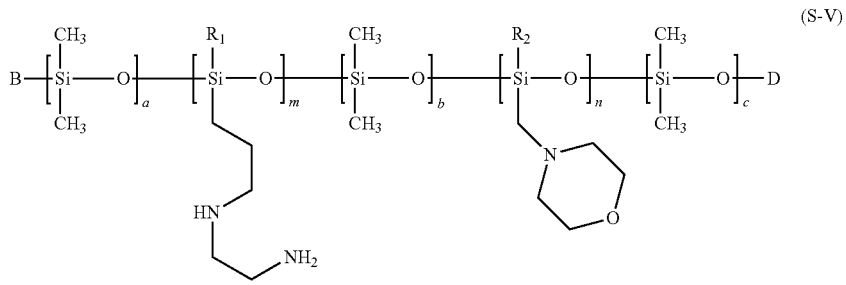
(S-V)

A very particularly preferred amino-functionalized silicone polymer is known as amodimethicone/morpholinomethyl silsesquioxane copolymer and is available in the form of the raw material Belsil ADM 8301 E commercially available from Wacker.

As a 4-morpholinomethyl-substituted silicone, for example, a silicone can be used which has structural units of the formulae (S-XII), (S-XIII') and (S-XIV')

where:
R1 stands for —CH$_3$, —OH, —OCH$_3$, —O—CH$_2$CH$_3$, —O—CH$_2$CH$_2$CH$_3$, or —O—CH(CH$_3$)$_2$
R$_2$ stands for —CH$_3$, —OH, or —OCH$_3$
B represents a group —OH, —O—Si(CH$_3$)$_3$, —O—Si(CH$_3$)$_{20}$H, —O—Si(CH$_3$)$_{20}$CH$_3$,
D for a group —H, —Si(CH$_3$)$_3$, —Si(CH$_3$)$_{20}$H, —Si(CH$_3$)$_{20}$CH$_3$, a, b and c stand independently for integers between 0 and 1000, with the Requirement a +b+c>0 m and n stand independently for integers between 1 and 1000 with the proviso that at least one of the conditions B=—OH or D=—H is fulfilled, the units a, b, c, m and n are distributed statistically or blockwise in the molecule.

Structural formula (Si—VI) is intended to illustrate that the siloxane groups n and m do not necessarily have to be directly bonded to a terminal grouping B or D, respectively. Rather, in preferred formulas (Si—VI) a>0 or b>0 and in particularly preferred formulas (Si—VI) a>0 and c>0, i.e., the terminal grouping B or D is preferably attached to a dimethylsiloxy grouping. Also, in formula (Si—VI), the siloxane units a, b, c, m and n are preferably statistically distributed.

The silicones used as contemplated herein represented by formula (Si—VI) can be trimethylsilyl-terminated (D or B=—Si(CH$_3$)$_3$), but they can also be dimethylsilylhydroxy-terminated on two sides or dimethylsilylhydroxy- and dimethylsilylmethoxy-terminated on one side. Silicones particularly preferred in the present disclosure are selected from silicones in which B=—O—Si(CH$_3$)$_{20}$H and D=—Si(CH$_3$)$_3$
B=—O—Si(CH$_3$)$_{20}$H and D=—Si(CH$_3$)$_{20}$H
B=—O—Si(CH$_3$)$_{20}$H and D=—Si(CH$_3$)$_{20}$CH$_3$
B=—O—Si(CH$_3$)$_3$ and D=—Si(CH$_3$)$_{20}$H
B=—O—Si(CH$_3$)$_{20}$CH$_3$ and D=—Si(CH$_3$)$_{20}$H To produce particularly resistant films, the agent (a) comprises the silicone polymer(s), in particular the alkoxy-modified and/or the amino-modified silicone polymers, preferably in specific ranges of amounts.

Particularly flexible films of low tack were obtained when an agent (a) was used in the process which comprises, based on the total weight of the agent (a), one or more silicone polymers (a3) in a total amount of about 0.1 to about 8 wt. %, preferably from about 0.1 to about 5 wt. %, more preferably from about 0.1 to about 3 wt. % and very particularly preferably from about 0.1 to about 0.5 wt. %.

In a further preferred embodiment, a process is wherein the agent (a) comprises, based on the total weight of the agent (a), one or more silicone polymers (a3) in a total amount of about 0.1 to about 15 wt. %, preferably from about 0.5 to about 12 wt. %, more preferably from about 1 to about 10 wt. % and very particularly preferably from about 2 to about 8 wt. %.

In an explicitly very particularly preferred embodiment, a process is wherein the agent (a) comprises—based on the total weight of the agent (a)—one or more alkoxy-modified silicone polymers (a3) in a total amount of about 0.1 to about 15 wt. %, preferably about 0.5 to about 12 wt. %, further preferably from about 1 to about 10 wt. % and very particularly preferred from about 2 to about 8 wt. %.

In an explicitly very particularly preferred embodiment, a process is wherein the agent (a) comprises—based on the total weight of the agent (a)—one or more amino-modified silicone polymers in a total amount of about 0.1 to about 15 wt. %, preferably from about 0.5 to about 12 wt. %, more preferably from about 1 to about 10 wt. % and most preferably from about 2 to about 8 wt. %.

pH Value of the Agent (a)

It has been found preferable if the agent (a) is made up in the form of a water-comprising agent adjusted to an alkaline pH.

To adjust the pH, the agent (a) may contain at least one alkalizing agent. To adjust the desired pH, the agents (a) may therefore also contain at least one alkalizing agent. The pH values in the sense of the present disclosure are pH values obtained at a temperature of 22° C. temperature.

As alkalizing agent, agent (a) may contain, for example, ammonia, alkanolamines and/or basic amino acids.

The alkanolamines which can be used in the agents are preferably selected from primary amines having a C2-C6 alkyl parent carrying at least one hydroxyl group. Preferred alkanolamines are selected from the group formed by 2-aminoethan-1-ol (monoethanolamine), 3-aminopropan-1-ol, 4-aminobutan-1-ol, 5-aminopentan-1-ol, 1-aminopropan-2-ol, 1-aminobutan-2-ol, 1-aminopentan-2-ol, 1-aminopentan-3-ol, 1-aminopentan-4-ol, 3-amino-2-methylpropan-1-ol, 1-amino-2-methylpropan-2-ol, 3-aminopropane-1,2-diol, 2-amino-2-methylpropane-1,3-diol Particularly preferred alkanolamines are selected from 2-aminoethan-1-ol and/or 2-amino-2-methylpropan-1-ol. A particularly preferred embodiment is therefore wherein the agent comprises as alkalizing agent an alkanolamine selected from 2-aminoethan-1-ol and/or Amino-2-methylpropan-1-ol.

For the purposes of the present disclosure, an amino acid is an organic compound comprising in its structure at least one protonatable amino group and at least one —COOH or one —SO$_3$H group. Preferred amino acids are amino carboxylic acids, α-(alpha)-Amino carboxylic acids and ω-amino carboxylic acids, where α-amino carboxylic acids are particularly preferred.

Basic amino acids are those amino acids which have an isoelectric point pI greater than 7. Basic α-amino carboxylic acids contain at least one asymmetric carbon atom. In the context of the present disclosure, both enantiomers can be used equally as specific compounds or also mixtures thereof, as racemates. However, it is particularly advantageous to use the naturally preferable isomeric form, usually in L-configuration.

The basic amino acids are preferably selected from the group formed by arginine, lysine, ornithine and histidine, particularly preferably arginine and lysine. In a further particularly preferred embodiment, an agent is therefore wherein the alkalizing agent is a basic amino acid from the group comprising arginine, lysine, ornithine and/or histidine.

In addition, the agent may contain further alkalizing agents, in particular inorganic alkalizing agents. Inorganic alkalizing agents that can be substituted as contemplated herein are preferably selected from the group formed by sodium hydroxide, potassium hydroxide, calcium hydroxide, barium hydroxide, sodium phosphate, potassium phosphate, sodium silicate, sodium metasilicate, potassium silicate, sodium carbonate and potassium carbonate.

Very particularly preferred alkalizing agents are ammonia, 2-aminoethan-1-ol (monoethanolamine), 3-aminopropan-1-ol, 4-aminobutan-1-ol, 5-aminopentan-1-ol, 1-aminopropan-2-ol, 1-aminobutan-2-ol, 1-aminopentan-2-ol, 1-aminopentan-3-ol, 1-aminopentan-4-ol, 3-amino-2-methylpropan-1-ol, 1-amino-2-methylpropan-2-ol, 3-aminopropane-1,2-diol, 2-amino-2-methylpropane-1,3-diol, arginine, lysine, ornithine, histidine, sodium hydroxide, potassium hydroxide, calcium hydroxide, barium hydroxide, sodium phosphate, potassium phosphate, sodium silicate, sodium metasilicate, potassium silicate, sodium carbonate and potassium carbonate.

Although the agents (a) are preferably adjusted to pH values in the alkaline range, it may nevertheless be necessary in principle to also use acidifiers in small quantities for fine adjustment of the desired pH value. Acidifiers suitable as contemplated herein are, for example, citric acid, lactic acid, acetic acid or also dilute mineral acids (such as hydrochloric acid, sulfuric acid, phosphoric acid).

However, in the course of the work leading to the present disclosure, it has been found that the presence of the alkalizing agent or the adjustment of the alkaline pH is essential for the formation of resistant films on the keratinous material. The presence of excessive amounts of acids can have a negative effect on the strength of the films. For this reason, it has proved preferable to keep the quantities of acids used in the agent (a) as low as possible. For this reason, it is advantageous if the total amount of organic and/or inorganic acids included in the agent (a) does not exceed a certain value.

In a further preferred embodiment, a process is wherein the total amount of organic acids from the group comprising citric acid, tartaric acid, malic acid and lactic acid included in the agent (a) is below about 1 wt. %, preferably below about 0.7 wt. %, more preferably below about 0.5 wt. %, even more preferably below about 0.1 wt. % and most preferably below about 0.01 wt. %.

In a further preferred embodiment, a process is wherein the total amount of inorganic acids from the group comprising hydrochloric acid, sulfuric acid and phosphoric acid included in the agent (a) is less than about 1 wt. %, preferably less than about 0.7 wt. %, more preferably less than about 0.5 wt. % wt. %, even more preferably below about 0.1 wt. % and very particularly preferably below about 0.01 wt. %.

The maximum total amounts of the acids included in the agent (a) given above are always based on the total weight of the agent (a).

Agent (b)

The method of treatment of keratinous material includes, in addition to the application of agent (a), the application of agent (b). The agent (b) is wherein it comprises at least one sealing reagent (b1).

Agent (b) is a post-treatment agent and the application of agent (b) to the keratinous material treated with agent (a) has the effect of making the colorations obtained in the process more durable. In particular, the use of agent (b) can improve the fastness to washing and the fastness to rubbing of the dyeings obtained in the process.

It is preferred, that the sealing reagent comprises a compound selected from the group of film forming polymers, alkalizing agents, acidifying agents and mixtures thereof. It may be preferred that the sealing reagent comprises a film-forming polymer.

Polymers are understood to be macromolecules with a molecular weight of at least about 1000 g/mol, preferably of at least about 2500 g/mol, particularly preferably of at least about 5000 g/mol, which include identical, repeating organic units. The polymers of the present disclosure may be synthetically produced polymers prepared by polymerizing one type of monomer or by polymerizing diverse types of monomers that are structurally different from each other. If the polymer is produced by polymerization of a monomer type, it is referred to as homo-polymers. If structurally different monomer types are used in the polymerization, the resulting polymer is called a copolymer.

The maximum molecular weight of the polymer depends on the degree of polymerization (number of polymerized monomers) and the batch size and is partly determined by the polymerization method. In terms of the present disclosure, it is preferred if the maximum molecular weight of the film-forming polymer as sealing reagent (b1) is not more than $10^7$ g/mol, preferably not more than $10^6$ g/mol, and particularly preferably not more than $10^5$ g/mol.

For the purposes of the present disclosure, a film-forming polymer is understood to be a polymer capable of forming a film on a substrate, for example on a keratinous material or a keratinous fiber. The formation of a film can be demonstrated, for example, by viewing the polymer-treated keratinous material under a microscope.

The film-forming polymers (b1) in the agent (b) can be hydrophilic or hydrophobic.

In a first embodiment, it may be preferred to use at least one hydrophobic film-forming polymer in agent (b). A hydrophobic polymer is defined as a polymer that has a solubility in water at 25° C. (760 mmHg) of less than about 1 wt. %.

For example, the water solubility of the film-forming hydrophobic polymer can be determined in the following way. 1 g of the polymer is placed in a beaker. Make up to 100 g with water. A stirring fish is added, and the mixture is heated to 25° C. on a magnetic stirrer with stirring. It is stirred for 60 minutes. The aqueous mixture is then visually assessed. If the polymer-water mixture cannot be visually assessed due to high turbidity of the mixture, the mixture is filtered. If a proportion of undissolved polymer remains on the filter paper, the solubility of the polymer is less than about 1 wt. %.

In particular, the polymers of the acrylic acid type, the polyurethanes, the polyesters, the polyamides, the polyureas, the cellulose polymers, the nitro-cellulose polymers, the silicone polymers, the polymers of the acrylamide type and the polyisoprenes can be mentioned here. Particularly suitable film-forming, hydrophobic polymers are, for example, polymers from the group of copolymers of acrylic acid, copolymers of methacrylic acid, homopolymers or copolymers of acrylic acid-esters, homopolymers or copolymers of methacrylic acid-esters, homopolymers or copolymers of acrylic acid-amides, homopolymers or copolymers of methacrylic acid amides, copolymers of vinylpyrrolidone, copolymers of vinyl alcohol, copolymers of vinyl acetate, homopolymers or copolymers of ethylene, homopolymers or copolymers of propylene, homopolymers or copolymers of styrene, polyurethanes, polyesters and/or polyamides.

In a further preferred embodiment, an agent (b) is wherein it comprises at least one film-forming, hydrophobic polymer (b1) selected from the group of copolymers of acrylic acid, copolymers of methacrylic acid, homopolymers or copolymers of acrylic acid esters, homopolymers or copolymers of methacrylic acid esters homopolymers or copolymers of acrylic acid amides, homopolymers or copolymers of methacrylic acid amides, copolymers of vinylpyrrolidone, copolymers of vinyl alcohol, copolymers of vinyl acetate, homopolymers or copolymers of ethylene, homopolymers or copolymers of propylene, homopolymers or copolymers of styrene, polyurethanes, polyesters and/or polyamides.

Film-forming hydrophobic polymers have proved to be particularly suitable for solving the problem as contemplated herein good selected from the group of synthetic polymers, polymers obtainable by free-radical polymerization or natural polymers.

Other particularly well-suited film-forming hydrophobic polymers can be selected from the homopolymers or copolymers of olefins, such as cycloolefins, butadiene, isoprene or styrene, vinyl ethers, vinyl amides, the esters or amides of (meth)acrylic acid with at least one $C_1$-$C_{20}$-alkyl group, an aryl group or a $C2$-$C_{10}$-hydroxyalkyl group.

Other film-forming hydrophobic polymers may be selected from the homo- or copolymers of lsooctyl (meth)acrylate, lsononyl (meth)acrylate, 2-ethylhexyl (meth)acrylate, lauryl (meth)acrylate, lsopentyl (meth)acrylate, n-butyl (meth)acrylate, lsobutyl (meth)acrylate, Ethyl (meth)acrylate, methyl (meth)acrylate, tert-butyl (meth) acrylate, stearyl (meth)acrylate, hydroxyethyl (meth)acrylate, 2-hydroxypropyl (meth)acrylate, 3-hydroxypropyl (meth)acrylate and/or mixtures thereof.

Other film-forming hydrophobic polymers may be selected from the homopolymers or copolymers of (meth) acrylamide, N-alkyl(meth)acrylamides, in those with $C_2$-$C_{18}$ alkyl groups, such as N-ethyl acrylamide, N-tert-butylacrylamide, i.e. N-octylacrylamide, N-di(C1-C4)alkyl(meth) acrylamide.

Other preferred anionic copolymers include copolymers of acrylic acid, methacrylic acid or their $C_1$-$C_6$ alkyl esters, as sold under the INCI declaration Acrylates Copolymers. A suitable commercial product is, for example, Aculyn® 33 from Rohm & Haas. Furthermore, preferred are copolymers of acrylic acid, methacrylic acid or their $C_1$-$C_6$ alkyl esters and the esters of an ethylenically unsaturated acid and an alkoxylated fatty alcohol. Suitable ethylenically unsaturated acids are acrylic acid, methacrylic acid and itaconic acid; suitable alkoxylated fatty alcohols are steareth-20 or ceteth-20.

Very particularly preferred polymers on the market are, for example, Aculyn® 22 (Acrylates/Steareth-20 Methacrylate Copolymer), Aculyn® 28 (Acrylates/Beheneth-25 Methacrylate Copolymer), Structure 2001@(Acryla-tes/Steareth-20 Itaconate Copolymer), Structure 3001@(Acrylates/Ceteth-20 Itaconate Copolymer), Structure Plus® (Acrylates/Aminoacrylates C10-30 Alkyl PEG-20 Itaconate Copolymer), Carbopol® 1342, 1382, Ultrez 20, Ultrez 21 (Acrylates/C 10-30 Alkyl Acrylate Crosspolymer), Synthalen W 2000® (Acrylates/Palmeth-25 Acrylate Copolymer) or the Rohme und Haas distributed Soltex OPT (Acrylates/C 12-22 Alkyl methacrylate Copolymer).

Suitable polymers based on vinyl monomers include, for example, the homopolymers and copolymers of N-vinylpyrrolidone, vinylcaprolactam, vinyl-(C1-C6)alkyl-pyrrole, vinyl oxazole, vinyl thiazole, vinyl pyrimidine or vinyl imidazole.

Also particularly suitable are the copolymers octylacrylamide/acrylates/butylaminoethyl methacrylate copolymer, such as those sold under the trade names AMPHOMER® or LOVOCRYL® 47 by NATIONAL STARCH, or the copolymers of acrylates/octylacrylamides sold under the trade names DERMACRYL® LT and DERMACRYL® 79 are marketed by NATIONAL STARCH.

Suitable polymers based on olefins include, for example, the homopolymers and copolymers of ethylene, propylene, butene, isoprene and butadiene.

In a further embodiment, the film-forming hydrophobic polymers may be the block copolymers comprising at least one block of styrene or the derivatives of styrene. These block copolymers may be copolymers comprising one or more blocks in addition to a styrene block, such as styrene/ethylene, styrene/ethylene/butylene, styrene/butylene, styrene/isoprene, styrene/butadiene. Corresponding polymers are marketed by BASF under the trade name "Luvitol HSB" commercially available.

Surprisingly, it was found that particularly intense and washfast colorations could be obtained when agent (b) included at least one film-forming polymer as sealing reagent (b1), selected from the group of homopolymers and copolymers of acrylic acid, homopolymers and copolymers of methacrylic acid, homopolymers and copolymers of acrylic acid esters, homopolymers and copolymers of methacrylic acid esters, homopolymers and copolymers of acrylic acid amides, homopolymers and copolymers of methacrylic acid amides, homopolymers and copolymers of vinylpyrrolidone, homopolymers and copolymers of vinyl alcohol, homopolymers and copolymers of vinyl acetate, homopolymers and copolymers of ethylene, homopolymers and copolymers of propylene, homopolymers and copolymers of styrene, polyurethanes, polyesters and polyamides.

In a further preferred embodiment, a process is wherein the agent (b) comprises at least one film-forming polymer as sealing reagent (b1), which is selected from the group of homopolymers and copolymers of acrylic acid, homopolymers and copolymers of methacrylic acid, homopolymers and copolymers of acrylic acid-ester, homopolymers and copolymers of methacrylic acid-ester, homopolymers and copolymers of acrylic acid-amides, homopolymers and copolymers of methacrylic acid-amides, homopolymers and copolymers of vinylpyrrolidone, homopolymers and copolymers of vinyl alcohol, homopolymers and copolymers of vinyl acetate, homopolymers and copolymers of ethylene, homopolymers and copolymers of propylene, homopolymers and copolymers of styrene, polyurethanes, polyesters and polyamides.

In a further embodiment, it may be preferred to use at least one hydrophilic film-forming polymer as sealing reagent (b1) in agent (b).

By a hydrophilic polymer is meant a polymer that has a solubility in water at 25° C. (760 mmHg) of more than 1 wt. %, preferably more than 2 wt. %.

The water solubility of the film-forming hydrophilic polymer can be determined, for example, in the following way. 1 g of the polymer is placed in a beaker. Make up to 100 g with water. A stirring fish is added, and the mixture is stirred on a magnetic stirrer to 25° C. with stirring. It is stirred for 60 minutes. The aqueous mixture is then visually assessed. A completely dissolved polymer appears macroscopically homogeneous. If the polymer-water mixture cannot be visually assessed due to high turbidity of the mixture, the mixture is filtered. If no undissolved polymer remains on the filter paper, then the solubility of the polymer is greater than 1 wt. %.

Nonionic, anionic and cationic polymers can be used as film-forming, hydrophilic polymers.

Suitable film-forming, hydrophilic polymers can be selected, for example, from the group of polyvinylpyrrolidone (co)polymers, polyvinyl alcohol (co)polymers, vinyl acetate (co)polymers, carboxyvinyl (co)polymers, acrylic acid (co)polymers, Methacrylic acid (co)polymers, natural gums, polysaccharides and/or acrylamide (co)polymers.

Furthermore, it is particularly preferred to use polyvinylpyrrolidone (PVP) and/or a vinylpyrrolidone-comprising copolymer as the film-forming hydrophilic polymer.

In another very particularly preferred embodiment, an agent (b) is wherein it comprises at least one film-forming hydrophilic polymer selected from the group of polyvinylpyrrolidone (PVP) and the copolymers of polyvinylpyrrolidone. It is further preferred if the agent comprises polyvinylpyrrolidone (PVP) as the film-forming hydrophilic polymer. Surprisingly, the wash fastness of the dyes obtained with PVP-comprising agents (b9 was also particularly good.

Particularly suitable polyvinylpyrrolidones are available, for example, under the name Luviskol® K from BASF SB Luviskol® K 90 or Luviskol® K 85 from BASF SE.

Another explicitly very suitable polyvinylpyrrolidone (PVP) can be the polymer PVP K30, which is sold by the company Ashland (ISP, POI Chemical). PVP K 30 is a polyvinylpyrrolidone that is very soluble in cold water and has the CAS number 9003-39-8. The molecular weight of PVP K 30 is about 40000 g/mol.

Other particularly well-suited polyvinylpyrrolidones are the substances known under the trade names LUVITEC K 17, LUVITEC K 30, LUVITEC K 60, LUVITEC K 80, LUVITEC K 85, LUVITEC K 90 and LUVITEC K 115, which are available from BASF.

The use of film-forming hydrophilic polymers (b1) from the group of copolymers of polyvinylpyrrolidone also led to particularly good and washfast color results. In this context, vinylpyrrolidone-vinyl ester copolymers, such as those sold under the trademark Luviskol® (BASF), can be mentioned as particularly suitable film-forming, hydrophilic polymers. Luviskol® VA 64 and Luviskol® VA 73, each vinylpyrrolidone/vinyl acetate copolymers, are particularly preferred nonionic polymers.

Of the vinylpyrrolidone-comprising copolymers, a styrene/VP copolymer and/or a vinylpyrrolidone-vinyl acetate copolymer and/or a VP/DMAPA acrylates copolymer and/or a VP/vinyl caprolactam/DMAPA acrylates copolymer are very preferably used in the cosmetic compositions.

Vinylpyrrolidone-vinyl acetate copolymers are marketed by BASF SE under the name Luviskol® VA. For example, a VP/vinyl caprolactam/DMAPA acrylates copolymer is sold under the trade name Aquaflex® SF-40 by Ashland Inc. For example, a VP/DMAPA acrylates copolymer is marketed as Styleze CC-10 by Ashland and is a highly preferred vinylpyrrolidone-comprising copolymer.

Other suitable copolymers of polyvinylpyrrolidone may include those obtained by reacting N-vinylpyrrolidone with at least one further monomer selected from the group of V-vinylformamide, vinyl acetate, ethylene, propylene, acrylamide, vinylcaprolactam, vinylcaprolactone and/or vinyl alcohol.

In another very particularly preferred embodiment, an agent (b) is wherein it comprises at least one film-forming hydrophilic polymer (b1) selected from the group of polyvinylpyrrolidone (PVP), vinylpyrrolidone/vinyl acetate-copolymers, vinylpyrrolidone/styrene copolymers, vinylpyrrolidone/ethylene copolymers, vinylpyrrolidone/propylene copolymers, vinylpyrrolidone/vinyl caprolactam copolymers, vinylpyrrolidone/vinylformamide copolymers and/or vinylpyrrolidone/vinyl alcohol copolymers.

Another suitable copolymer of vinylpyrrolidone is the polymer known under the INCI name maltodextrin/VP copolymer.

Furthermore, intensively colored keratinous material, especially hair, could be obtained with particularly good wash fastness properties when a nonionic film-forming hydrophilic polymer was used as the film-forming hydrophilic polymer.

In a further embodiment, the agent (b) may comprise at least one nonionic film-forming hydrophilic polymer (b1).

As contemplated herein, a nonionic polymer is a polymer which, in a protic solvent—such as water, for example—does not carry structural units with permanent cationic or anionic groups under standard conditions, which must be compensated by counterions while maintaining electroneutrality. Cationic groups include, for example, quaternized ammonium groups but not protonated amines. Anionic groups include, for example, carboxylic and sulfonic acid groups.

Agents are particularly preferred which contain, as a nonionic, film-forming, hydrophilic polymer, at least one polymer selected from the group of polyvinylpyrrolidone,
Copolymers of N-vinylpyrrolidone and vinyl esters of carboxylic acids comprising 2 to 18 carbon atoms of N-vinylpyrrolidone and vinyl acetate,
Copolymers of N-vinylpyrrolidone and N-vinylimidazole and methacrylamide,
Copolymers of N-vinylpyrrolidone and N-vinylimidazole and acrylamide,
Copolymers of N-vinylpyrrolidone with N,N-di(C1 to C4)-alkylamino-(C2 to C4)-alkyl acrylamide.

If copolymers of N-vinylpyrrolidone and vinyl acetate are used, it is again preferred if the molar ratio of the structural units included from the monomer N-vinylpyrrolidone to the structural units of the polymer included from the monomer vinyl acetate is in the range from about 20 to 80 to about 80 to 20, from about 30 to 70 to about 60 to 40. Suitable copolymers of vinylpyrrolidone and vinyl acetate are available, for example, under the trademark Luviskol® VA 37, Luviskol® VA 55, Luviskol® VA 64 and Luviskol® VA 73 from the company BASF SE available.

Another particularly preferred polymer is selected from polymers with the INCI designation VP/Methacrylamide/Vinyl Imidazole Copolymer, which are available, for example, under the trade name Luviset Clear from BASF SE.

Another particularly preferred nonionic, film-forming, hydrophilic polymer is a copolymer of N-vinylpyrrolidone and N,N-dimethylaminiopropylmethacrylamide, which is sold, for example, by ISP under the INCI designation VP/DMAPA Acrylates Copolymer, e.g., under the trade name Styleze® CC 10.

A cationic polymer is the copolymer of N-vinylpyrrolidone, N-vinylcaprolactam, N-(3-dimethylaminopropyl) methacrylamide and 3-(methacryloylamino)propyl-lauryldimethylammonium chloride (INCI designation: Polyquaternium-69), which is marketed, for example, under the trade name AquaStyle® 300 (28-32 wt. % active substance in ethanol-water mixture, molecular weight 350000) by the company ISP.

Other suitable film-forming hydrophilic polymers include
Vinylpyrrolidone-vinylimidazolium methochloride copolymers, such as those sold under the names Luviquat® FC 370, FC 550 and the INCI designation Polyquaternium-16 as well as FC 905 and HM 552,
Vinylpyrrolidone-vinylcaprolactam-acrylate terpolymers, such as those offered commercially with acrylic acid esters and acrylic acid amides as the third monomer building block, for example under the name Aquaflex® SF 40.

Polyquaternium-11 is the reaction product of diethyl sulfate with a copolymer of vinylpyrrolidone and dimethylaminoethyl methacrylate. Suitable commercial products are available, for example, under the names Dehyquart® CC 11 and Luviquat® PQ 11 PN from BASF SE or Gafquat 440, Gafquat 734, Gafquat 755 or Gafquat 755N from Ashland Inc. Polyquaternium-46 is the reaction product of vinylcaprolactam and vinylpyrrolidone with methylvinylimidazolium methosulfate and is available, for example, under the name Luviquat® Hold from BASF SE. Polyquaternium-46 is preferably used in an amount of 1 to 5 wt. %-based on the total weight of the cosmetic composition. It is particularly preferred that polyquaternium-46 is used in combination with a cationic guar compound. In fact, it is highly preferred that polyquaternium-46 be used in combination with a cationic guar compound and polyquaternium-11.

Suitable anionic film-forming hydrophilic polymers can be, for example, acrylic acid polymers, which can be present in uncrosslinked or crosslinked form. Corresponding products are sold, for example, under the trade names Carbopol 980, 981,954, 2984 and 5984 from the company Lubrizol or under the names Synthalen M and Synthalen K from the company 3V Sigma (The Sun Chemicals, Inter Resin).

Examples of suitable film-forming, hydrophilic polymers from the group of natural gums are xanthan gum, gellan gum, carob gum.

Examples of suitable film-forming, hydrophilic polymers from the group of polysaccharides are hydroxyethyl cellulose, hydroxypropyl cellulose, ethyl cellulose and carboxymethyl cellulose. Suitable film-forming, hydrophilic polymers from the group of acrylamides are, for example, polymers which, starting from monomers of the (meth)acrylamido-C1-C4-alkyl-sulfonic acid or salts thereof. Corresponding polymers may be selected from the polymers of polyacrylamidomethanesulfonic acid, polyacrylamidoethanesulfonic acid, polyacrylamidopropanesulfonic acid, Poly2-acrylamido-2-methylpropanesulfonic acid, Poly-2-methylacrylamido-2-methylpropanesulfonic acid and/or poly-2-methylacrylamido-n-butanesulfonic acid.

Preferred polymers of Poly(meth)arylamido-C1-C4-alkylsulfonic acids are crosslinked and at least 90% neutralized. These polymers can be crosslinked or non-crosslinked.

Crosslinked and completely or partially neutralized polymers of the type of Poly-2-acrylamido-2-methylpropane sulfonic acids are known under the INCI names "Ammonium Polyacrylamido-2-methyl-propanesulphonate" or "Ammonium Polyacryldimethyltauramide".

Another preferred polymer of this type is the cross-linked polymer marketed by Clariant under the trade name Hostacerin AMPS Poly-2-acrylamido-2methyl-propanesulfonic acid polymer, which is partially neutralized with ammonia.

In a further explicitly very particularly preferred embodiment, a process is wherein the agent (b) comprises at least one anionic, film-forming, polymer (b1).

In this context, the best results were obtained when the agent (b) comprises, as sealing reagent (b1), at least one film-forming polymer comprising at least one structural unit of the formula (P-I) and at least one structural unit of the formula (P-II)

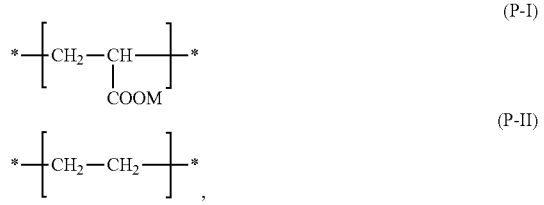

where
M is a hydrogen atom or ammonium (NFU), sodium, potassium, $^{1/2}$magnesium or $^{1/2}$calcium.

In a further preferred embodiment, a process is wherein the agent (b) comprises at least one film-forming polymer as sealing reagent (b1), which comprises at least one structural unit of the formula (P-I) and at least one structural unit of the formula (P-II)

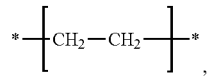

where M represents a hydrogen atom or ammonium (NH4), Sodium, potassium, $^{1/2}$ Magnesium or $^{1/2}$ calcium.

When M represents a hydrogen atom, the structural unit of the formula (P-I) is based on an acrylic acid unit. When M represents an ammonium counterion, the structural unit of formula (P-I) is based on the ammonium salt of acrylic acid. When M represents a sodium counterion, the structural unit of formula (P-I) is based on the sodium salt of acrylic acid.

When M represents a potassium counterion, the structural unit of formula (P-I) is based on the potassium salt of acrylic acid. If M stands for a half equivalent of a magnesium counterion, the structural unit of the formula (P-I) is based on the magnesium salt of acrylic acid. If M stands for a half equivalent of a calcium counterion, the structural unit of the formula (P-I) is based on the calcium salt of acrylic acid.

The film-forming polymer(s) (b1) is/are preferably used in the agent (b) in certain quantity ranges. In this connection, it has proved particularly preferable for solving the problem as contemplated herein if the agent (b) comprises—based on the total weight of the agent (b)—one or more film-forming polymers (b1) in a total amount of about 0.1 to about 18 wt. %, preferably of about 1 to about 16 wt. %, further preferably of about 5 to about 14.5 wt. %, and very particularly preferably of about 8 to about 12 wt. %.

In a further preferred embodiment, a process is wherein the agent (b) comprises—based on the total weight of the agent (b)—one or more film-forming polymers (b1) in a total amount of about 0.1 to about 18 wt. %, preferably from about 1 to about 16 wt. %, more preferably from about 5 to about 14.5 wt. % and very particularly preferably from about 8 to about 12 wt. % comprises.

The application of agent (b) comprising a film-forming polymer as sealing reagent (b1) is intended to seal and/or fix the colored film initially produced by the application of agent (a). With application of the second agent (b) with a film-forming polymer as sealing reagent (b1), the film-forming polymer (b1) is deposited on the colored film produced in the first layer (b1) in the form of a further film. The multilayer film system created in this way exhibits improved resistance to external influences.

In this case, the sealing agent formed by agent (b) comprising a film-forming polymer as sealing agent (b1) is preferably not colored itself. In this way, it can also be ensured that any abrasion to a certain extent of the second film formed by agent (b) does not lead to any color changes in the entire film system. It is therefore particularly preferred if the agent (b) comprises no or only exceedingly lesser amounts of colorant compounds.

In an alternative embodiment, the sealing reagent (b1) comprises an alkalizing agent. Particularly preferably, the alkalizing agent is selected from the group of ammonia, C2-C6-Alkanolamines, basic amino acids, alkali metal hydroxides and alkaline earth metal hydroxides.

In a further particularly preferred embodiment, a process is wherein the agent (b) comprises at least one alkalizing agent as sealing reagent (b1) which is selected from the group of ammonia, $C_2$-$C_6$-Alkano!amines, basic amino acids, alkali metal hydroxides, alkaline earth metal hydroxides, alkali metal silicates, alkali metal metasilicates, alkaline earth metal silicates, alkaline earth metal metasilicates, alkali metal carbonates and alkaline earth metal carbonates.

It has been found that aftertreatment with an agent (b) comprising ammonia exerts a particularly good influence on improving the wash fastness and rub fastness of the dyeings obtained in the process.

In a further particularly preferred embodiment, a method is wherein the composition (b) is used as a sealing reagent (b1) comprises ammonia.

Likewise, satisfactory results were obtained when composition (b) was used as a sealing reagent (b1) comprising at least one C2-C6-Alkanolamine.

The alkanolamines that can be substituted in composition (b) can be selected, for example, from the group of primary amines having a C2-C6 alkyl parent bearing at least one hydroxyl group. Preferred alkanolamines are selected from the group formed by 2-aminoethan-1-ol (monoethanolamine), 3-aminopropan-1-ol, 4-aminobutan-1-ol, 5-aminopentan-1-ol, 1-aminopropan-2-ol, 1-aminobutan-2-ol, 1-aminopentan-2-ol, 1-aminopentan-3-ol, 1-aminopentan-4-ol, 3-amino-2-methylpropan-1-ol, 1-amino-2-methylpropan-2-ol, 3-aminopropane-1,2-diol, 2-amino-2-methylpropane-1,3-diol.

In a further preferred embodiment, a process as contemplated herein is wherein the composition (b) comprises as sealing reagent (b1) at least one alkalizing agent from the group of alkanolamines, which is preferably selected from the group of 2-aminoethan-1-ol (monoethanolamine), 3-aminopropan-1-ol, 4-aminobutan-1-ol, 5-aminopentan-1-ol, 1-aminopropan-2-ol, 1-aminobutan-2-ol, 1-aminopentan-2-ol, 1-aminopentan-3-ol, 1-aminopentan-4-ol, 3-amino-2-methylpropan-1-ol, 1-amino-2-methylpropan-2-ol, 3-aminopropane-1,2-diol and 2-amino-2-methylpropane-1,3-diol. Likewise, satisfactory results were obtained when composition (b) included at least one basic amino acid as sealing reagent (b1).

For the purposes of the present disclosure, an amino acid is an organic compound having in its structure at least one protonatable amino group and at least one —COOH or one —SO$_3$H group. Preferred amino acids are amino carboxylic acids, α-(alpha)-amino carboxylic acids and ω-amino carboxylic acids, where α-amino carboxylic acids are particularly preferred.

As contemplated herein, basic amino acids are those amino acids which have an isoelectric point PI greater than about 7.0.

Basic α-amino carboxylic acids contain at least one asymmetric carbon atom. In the context of the present disclosure, both enantiomers can be used equally as specific compounds or also mixtures thereof, as racemates. However, it is particularly advantageous to use the naturally preferable isomeric form, usually in L-configuration.

The basic amino acids are preferably selected from the group formed by arginine, lysine, ornithine and histidine, particularly preferably arginine and lysine. In a further particularly preferred embodiment, the method is therefore wherein the sealing reagent (b1) is an alkalizing agent comprising a basic amino acid selected from the group of arginine, lysine, ornithine and/or histidine.

In a further preferred embodiment, the method is wherein the agent (b) is sealing reagent (b1) comprises at least one alkalizing agent from the group of basic amino acids, which is preferably selected from the group of arginine, lysine, ornithine and histidine. Satisfactory results were also obtained when the agent (b) included at least one alkali metal hydroxide as sealing reagent (b1). Examples of well-suited alkali metal hydroxides are sodium hydroxide and potassium hydroxide.

Satisfactory results were also obtained when the composition (b) included, as sealing reagent (b1), an alkalizing agent comprising at least one alkaline earth metal hydroxide. Suitable alkaline earth metal hydroxides include magnesium hydroxide, calcium hydroxide and barium hydroxide. Satisfactory results were also obtained when the agent (b) included at least one alkali metal silicate and/or alkali metal metasilicate as sealing reagent (b1). Suitable alkali metal silicates include sodium silicate and potassium silicate. Suitable alkalimetal1metasilicates include sodium metasilicate and potassium metasilicate.

Satisfactory results were also obtained when the agent (b) included at least one alkali metal carbonate and/or alkaline earth metal carbonate as sealing reagent (b1). Suitable alkali metal carbonates include sodium carbonate and potassium carbonate. Suitable alkaline earth metal carbonates include magnesium carbonate and calcium carbonate.

Within the group of the sealing reagent (b1) in the form of an alkalizing agent, ammonia, C2-C$_6$ alkanolaminenes, basic amino acids and alkali metal hydroxides have proved to be particularly suitable.

In a further particularly preferred embodiment, the method is wherein the agent (b) comprises as sealing reagent (b1) at least one alkalizing agent selected from the group of ammonia, C$_2$-C$_6$-Alkanolaminenes, basic amino acids and alkali metal hydroxides.

In a further particularly preferred embodiment, the process is wherein the agent (b) comprises as sealing reagent (b1) at least one alkalizing agent selected from the group of ammonia, 2-aminoethan-1-ol, 3-aminopropan-1-ol, 4-aminobutan-1-ol, 5-aminopentan-1-ol, 1-aminopropan-2-ol, 1-aminobutan-2-ol, 1-aminopentan-2-ol, 1-aminopentan-3-ol, 1-aminopentan-4-ol, 3-amino-2-methylpropan-1-ol, 1-amino-2-methylpropan-2-ol, 3-aminopropane-1,2-diol, 2-amino-2-methylpropane-1,3-diol, arginine, lysine, ornithine, histidine, sodium hydroxide and potassium hydroxide.

Composition (b) comprises the alkalizing agent as a sealing reagent (b1) in a cosmetic carrier, preferably in an aqueous cosmetic carrier.

In this context, it has been found preferable if the agent (b) comprises—based on the total weight of the agent (b)—about 5.0 to about 99.0 wt. %, preferably about 15.0 to about 97.0 wt. %, further preferably about 25.0 to about 97.0 wt. % still more preferably about 35.0 to about 97.0 wt. % and very particularly preferably about 45.0 to about 97.0 wt. % of water.

In a further embodiment, the method is wherein the agent (b) comprises—based on the total weight of the agent (b)—about 5.0 to about 99.0 wt. %, preferably about 15.0 to about 97.0 wt. %, further preferred about 25.0 to about 97.0 wt. %, still more preferably about 35.0 to about 97.0 wt. % and very particularly preferred about 45.0 to about 97.0 wt. % water.

The alkalizing agents included in the agent (b) exert an influence on the pH value of the agent (b). It was found that certain alkaline pH values have a beneficial effect on the dyeing performance achievable in the process and the fastness properties of the dyeings.

For this reason, it is preferred that the agent (b), comprising an alkalizing agent as sealing reagent (b1), has a pH of from about 7.0 to about 12.0, preferably from about 7.5 to about 11.5, more preferably from about 8.0 to about 11.0 and most preferably from about 8.5 to about 9.5. The pH value can be measured using the usual methods known from the state of the art, such as pH measurement using glass electrodes via combination electrodes or using pH indicator paper.

In a further particularly preferred embodiment, the process is wherein the agent (b) comprises an alkalizing agent as sealing reagent (b1) and has a pH of from about 7.0 to about 12.0, preferably from about 7.5 to about 11.5, more preferably from about 8.0 to about 11.0, and most preferably from about 8.5 to about 9.5.

For the pH values for the purposes of the present disclosure are pH values obtained at a temperature of 22° C. temperature.

In a still further alternative embodiment, the sealing reagent (b1) comprises an acidifying agent. Particularly preferably, the acidifying agent is selected from the group of inorganic acids, organic acids and mixtures thereof.

Satisfactory results could be obtained when agent (b) comprises at least one inorganic acid as sealing reagent (b1). Suitable inorganic acids are, for example, phosphoric acid, sulfuric acid and/or hydrochloric acid, with sulfuric acid being particularly preferred.

In a further preferred embodiment, the method is wherein the agent (b) is sealing reagent (b1) comprises at least one acidifying agent from the group of inorganic acids, which is preferably selected from the group of phosphoric acid, sulfuric acid, hydrochloric acid and mixtures thereof.

In a further, even more preferred embodiment, the method is wherein the agent (b) comprises sulfuric acid as sealing reagent (b1).

Satisfactory results were also obtained when agent (b) included at least one organic acid as sealing reagent (b1). The organic acid is preferably selected from the group of formic acid, acetic acid, propionic acid, butyric acid, isobutyric acid, valeric acid, isovaleric acid, pivalic acid, oxalic acid, malonic acid, succinic acid, glutaric acid, Glyceric acid, glyoxylic acid, adipic acid, pimelic acid, corkic acid, azelaic acid, sebacic acid, propiolic acid, crotonic acid, isocrotonic acid, elaidic acid, maleic acid, fumaric acid, muconic acid, citraconic acid, mesaconic acid, camphoric acid, benzoic acid, o,m,p-phthalic acid, naphthoic acid, toluoylic acid, hydratropic acid, atropic acid, cinnamic acid, isonicotinic acid, nicotinic acid, bicarbamic acid, 4,4'-dicyano-6,6'-binicotinic acid, 8-carbamoyloctanoic acid, 1,2,4-pentanetricarboxylic acid, 2-pyrrolecarboxylic acid, 1,2,4,6,7-napthalenepentaacetic acid, malonaldehyde acid, 4-hydroxy-phthalamic acid, 1-pyrazolecarboxylic acid, gallic acid or propane tricarboxylic acid, glycolic acid, gluconic acid, lactic acid, maleic acid, ascorbic acid, malic acid, tartaric acid, citric acid and mixtures thereof.

In a further preferred embodiment, the process is wherein the agent (b) comprises as sealing reagent (b1) at least one acidifying agent from the group of organic acids and wherein the organic acid is preferably selected from the group of formic acid, acetic acid, propionic acid, butyric acid, isobutyric acid, valeric acid, isovaleric acid, pivalic acid, oxalic acid, malonic acid, bemsteinic acid, glutaric acid, glyceric acid, glyoxylic acid, adipic acid, pimelic acid, corkic acid, azelaic acid, sebacic acid, propiolic acid, crotonic acid, Isocrotonic acid, elaidic acid, maleic acid, fumaric acid, muconic acid, citraconic acid, mesaconic acid, camphoric acid, benzoic acid, o,m,p-phthalic acid, naphthoic acid, toluoylic acid, hydratropic acid, atropic acid, cinnamic acid, Isonicotinic acid, nicotinic acid, bicarbamic acid, 4,4'-dicyano-6,6'-binicotinic acid, 8-carbamoyloctanoic acid, 1,2,4-pentanetricarboxylic acid, 2-pyrrolecarboxylic acid, 1,2,4,6,7-napthalenepentaacetic acid, malonaldehyde acid, 4-hydroxy-phthalamic acid, 1-pyrazolecarboxylic acid, gallic acid or propane tricarboxylic acid, glycolic acid, gluconic acid, lactic acid, maleic acid, ascorbic acid, malic acid, tartaric acid, citric acid and mixtures thereof.

In a further, even more preferred embodiment, the method is wherein the agent (b) comprises acetic acid as sealing reagent (b1).

Also, suitable acidifiers include methanesulfonic acid and/or 1-hydroxyethane-1,1-diphosphonic acid.

Within the group of the above-mentioned sealing reagents (b1) in the form of an acidifying agent, sulfuric acid and/or acetic acid have proved to be particularly suitable. In a further particularly preferred embodiment, the method is wherein the agent (b) comprises as sealing reagent (b1) at least one acidifying agent selected from the group of sulfuric acid, acetic acid and mixtures thereof.

Agent (b) comprises the acidifying agent as sealing reagent (b1) in a cosmetic carrier, preferably in an aqueous cosmetic carrier.

The acidifying agents included in the agent (b) exert an influence on the pH of the agent (b). It was found that acidic pH values also have a beneficial effect on the dyeing performance achievable in the process and the fastness properties of the dyeings.

For this reason, it is preferred that the agent (b) comprising an acidifying agent as sealing reagent (b1) has a pH of from about 2.0 to about 6.5, preferably from about 3.0 to about 6.0, more preferably from about 4.0 to about 6.0, and most preferably from about 4.5 to about 5.5.

The measurement of the pH value can be carried out using the usual methods known from the prior art, such as pH measurement by employing glass electrodes via combination electrodes or via pH indicator paper.

In a further particularly preferred embodiment, the process is wherein the agent (b) comprises an acidifying agent as sealing reagent (b1) and has a pH of from about 2.0 to about 6.5, preferably from about 3.0 to about 6.0, more preferably from about 4.0 to about 6.0, and most preferably from about 4.5 to about 5.5.

The pH values for the purposes of the present disclosure are pH values measured at a temperature of 22° C.

Other Ingredients in the Agents (a) and (b)

The previously described agents (a) and (b) may further include one or more optional ingredients.

The agents may additionally contain one or more surfactants. The term surfactants are used to describe surface-active substances. A distinction is made between anionic surfactants comprising a hydrophobic residue and a negatively charged hydrophilic head group, amphoteric surfactants, which carry both a negative and a compensating positive charge, cationic surfactants, which have a positively charged hydrophilic group in addition to a hydrophobic residue, and nonionic surfactants, which have no charges but strong dipole moments and are strongly hydrated in aqueous solution.

The term zwitterionic surfactants is used to describe surface-active compounds that contain in the molecule at least one quaternary ammonium group and at least one —COO(⁻)— or —SO$_3$(⁻)—Group. Particularly suitable zwitterionic surfactants are the so-called betaines such as the N-alkyl-N,N-dimethylammonium glycinates, for example the coconut alkyl dimethylammonium glycinate, N-acylaminopropyl-N,N-dimethylammoniumglycinate, for example the cocoacylaminopropyl-dimethylammoniumglycinate, and 2-alkyl-3-carboxymethyl-3-hydroxyethylimidazolines, each having 8 to 18 C atoms in the alkyl or acyl group, and the Cocosacylaminoethylhydroxyethylcarboxymethylglycinate. A preferred zwitterionic surfactant is the fatty acid amide derivative known under the INCI designation Cocamidopropyl Betaine. Ampholytic surfactants are those surface-active compounds which, in addition to a $C_8$-C24-Alkyl or -acyl group in the molecule, at least one free amino group and at least one —COOH or —$SO_3H$ group and can form internal salts. Examples of suitable ampholytic surfactants include N-alkylglycines, N-alkylpropionic acids, N-alkylaminobutyric acids, N-alkyliminodipropionic acids, N-hydroxyethyl-N-alkylamidopropylglycines, N-Alkyltaurines, N-alkylsarcosines, 2-alkylaminopropionic acids and alkylaminoacetic acids, each having about 8 to 24 carbon atoms in the alkyl group. Typical examples of amphoteric or zwitterionic surfactants are alkyl betaines, alkylamidobetaines, amino propionates, aminoglycinates, imidazolinium betaines and sulfobetaines.

Particularly preferred ampholytic surfactants are the N-cocosalkylaminopropionate, the cocosacylaminoethyl-aminopropionate and the $C_{12}$-$C_{18}$-Acyl sarcosine.

The agents may also additionally contain at least one nonionic surfactant. Suitable nonionic surfactants are alkyl polyglycosides as well as alkylene oxide addition products to fatty alcohols and fatty acids, each with 2 to 30 moles of ethylene oxide per mole of fatty alcohol or fatty acid, respectively. Preparations with suitable properties are also obtained if they contain, as nonionic surfactants, fatty acid esters of ethoxylated glycerol reacted with at least 2 moles of ethylene oxide.

Furthermore, the agents may also additionally contain at least one cationic surfactant. Cationic surfactants are surfactants, i.e., surface-active compounds, each with one or more positive charges. Cationic surfactants contain only positive charges. Typically, these surfactants are composed of a hydrophobic moiety and a hydrophilic head group, with the hydrophobic moiety usually comprising a hydrocarbon backbone (e.g., comprising one or two linear or branched alkyl chains), and the positive charge(s) located in the hydrophilic head group. Examples of cationic surfactants are quaternary ammonium compounds which may carry one or two alkyl chains with a chain length of 8 to 28 carbon atoms as hydrophobic radicals, quaternary phosphonium salts substituted with one or more alkyl chains having a chain length of 8 to 28 carbon atoms or tertiary sulfonium salts.

Furthermore, the cationic charge can also be part of a heterocyclic ring (e.g., an imidazolium ring or a pyridinium ring) in the form of an onium structure. In addition to the functional unit carrying the cationic charge, the cationic surfactant may also contain other uncharged functional groups, as is the case, for example, with esterquats. The cationic surfactants are used in a total amount of about 0.1 to about 45 wt. %, preferably about 1 to about 30 wt. % and very preferably from about 1 to about 15 wt. %-based on the total weight of the respective agent.

Furthermore, the agents may also contain at least one anionic surfactant. Anionic surfactants are surface-active agents with exclusively anionic charges (neutralized by a corresponding counter cation). Examples of anionic surfactants are fatty acids, alkyl sulfates, alkyl ether sulfates and ether carboxylic acids with 12 to 20 C atoms in the alkyl group and up to 16 glycol ether groups in the molecule.

The anionic surfactants are used in a total amount of about 0.1 to about 45 wt. %, preferably from about 1 to about 30 wt. % and most preferably from about 1 to about 15 wt. %—based on the total weight of the respective agent.

Agent (a) and/or agent (b) may further comprise a matting agent. Suitable matting agents include, for example, (modified) starches, waxes, talc and/or (modified) silicas. The amount of matting agent is preferably between about 0.1 and about 10 wt. % based on the total amount of agent (a) or agent (b). Preferably, agent (a) comprises a matting agent.

The agents may also contain other active ingredients, auxiliaries and additives, such as solvents, fatty components such as the $C_8$-$C_{30}$ fatty acid triglycerides, the $C_8$-$C_{30}$-Fatty acid monoglycerides, the $C_8$-$C_{30}$-Fatty acid diglycerides and/or hydrocarbons; structurants such as glucose, maleic acid and lactic acid, hair-conditioning compounds such as phospholipids, for example lecithin and kephalins; perfume oils, dimethyl isosorbide and cyclodextrins; fiber structure-improving active ingredients, in particular mono-, di- and oligosaccharides such as glucose, galactose, fructose, fructose and lactose; Dyes for coloring the product; anti-dandruff active ingredients such as piroctone olamine, zinc omadine and climbazole; amino acids and oligopeptides; protein hydrolysates on an animal and/or vegetable basis, as well as in the form of their fatty acid condensation products or optionally anionically or cationically modified derivatives; vegetable oils; light stabilizers and UV blockers; Active ingredients such as panthenol, pantothenic acid, pantolactone, allantoin, pyrrolidinonecarboxylic acids and their salts, and bisabolol; Polyphenols, in particular hydroxycinnamic acids, 6,7-dihydroxycoumarins, hydroxybenzoic acids, catechins, tannins, leucoanthocyanidins, anthocyanidins, flavanones, flavones and flavonols; ceramides or pseudoceramides; vitamins, provitamins and vitamin precursors; plant extracts; Fats and waxes such as fatty alcohols, beeswax, montan wax and kerosenes; swelling and penetrating agents such as glycerol, propylene glycol monoethyl ether, carbonates, hydrogen carbonates, guanidines, ureas and primary, secondary and tertiary phosphates; Opacifiers such as latex, styrene/PVP and styrene/acrylamide copolymers; pearlescent agents such as ethylene glycol mono- and distearate as well as PEG-3-distearate; and blowing agents such as propane-butane mixtures, N20, dimethyl ether, CO2 and air.

The selection of these other substances will be made by the skilled person according to the desired properties of the agents. Regarding further optional components as well as the quantities of these components used, reference is expressly made to the relevant manuals known to the skilled person. The additional active ingredients and auxiliaries are preferably used in the preparations as contemplated herein in amounts of from about 0.0001 to about 25 wt. % in each case, from about 0.0005 to about 15 wt. %, based on the total weight of the respective composition.

Process for Dyeing Keratinous Materials

In the process as contemplated herein, agents (a) and (b) are applied to the keratinous materials, to human hair. Thus, agents (a) and (b) are the ready-to-use means. Agents (a) and (b) are different from each other.

Agents (a) and (b) can in principle be applied simultaneously or successively, with successive application being preferred.

The best results were obtained when agent (a) was first applied to the keratinous materials in a first step and agent (b) was applied in a second step.

Quite particularly preferred, therefore, is a process for treating keratinous material, for coloring keratinous material, in particular human hair, comprising the following steps in the order indicated:

in a first step, applying an agent (a) to the keratinous material, the agent comprising (a):

(a1) at least one organic silicon compound selected from the group of silanes having one, two or three silicon atoms, and
(a2) at least one color-imparting compound comprising at least one effect pigment comprising α) a substrate platelet comprising synthetic mica, and β) a coating comprising at least a first metal oxide (hydrate) layer, and
in a second step, applying an agent (b) to the keratinous material, the agent (b) comprising:
(b1) at least one sealing reagent.

Moreover, to impart a high leaching resistance to the dyed keratinous material over a longer period, agents (a) and (b) are particularly preferably applied within the same dyeing process, which means that there is a period of a maximum of several hours between the application of agents (a) and (c).

In a further preferred embodiment, the method is wherein the agent (a) is applied first and then the agent (b) is applied, the time between the application of the agents (a) and (b) being at most 24 hours, preferably at most 12 hours and particularly preferably at most 6 hours.

A characteristic feature of the agent (a) is its content of at least one reactive organic silicon compound (a1). The reactive organic silicon compound(s) (a1) undergoes an oligomerization or polymerization reaction and thus functionalizes the hair surface as soon as it meets it. In this way, a first, film is formed. The coloring compounds (a2) are incorporated into the film so that it is colored. In the second step of the process, a second, polymer-comprising agent (b) is now applied to the hair. During the application of agent (b), the film-forming polymers interact with the silane film and are thus bound to the keratinous materials.

In a further embodiment, a method comprising the following steps in the order indicated is particularly preferred
(1) Application of the agent (a) on the keratinous material,
(2) Allowing the agent (a) to act for a period of 10 seconds to 10 minutes, preferably from 10 seconds to 5 minutes,
(3) if necessary, rinsing the keratinous material with water,
(4) Application of the agent (b) on the keratinous material,
(5) Allowing the agent (b) to act for a period of 30 seconds to 30 minutes, preferably from 30 seconds to 10 minutes,
(6) Rinse the keratinous material with water.

As contemplated herein, the rinsing of the keratinous material with water in steps (3) and (6) of the process is understood to mean that only water is used for the rinsing process, without the use of any other agents different from agents (a) and (b).

In step (1), agent (a) is first applied to the keratinous materials, in particular human hair.

After application, agent (a) is allowed to act on the keratinous materials. In this context, exposure times of 10 seconds to 10 minutes, preferably 20 seconds to 5 minutes and most preferably 30 seconds to 2 minutes on the hair have proven to be particularly advantageous.

In a preferred embodiment of the process, the agent (a) may now be rinsed from the keratinous materials prior to the agent (b) is applied to the hair in the subsequent step.

Coloring with equally good wash fastness were obtained when agent (b) was applied to the keratinous materials that were still exposed to agent (a).

In step (4), agent (b) is now applied to the keratinous materials. After application, the agent (b) is now left to act on the hair.

Even with a short contact time of the agent (b), the process allows the production of dyeings with particularly good intensity and wash fastness. Exposure times of about 10 seconds to about 10 minutes, preferably about 20 seconds to about 5 minutes and most preferably about 30 seconds to about 3 minutes on the hair have proven to be particularly advantageous.

In step (6), the agent (b) (and any agent (a) still present) is now rinsed out of the keratinous material with water.

In this embodiment, the sequence of steps (1) to (6) preferably takes place within 24 hours.

Agent (a) comprises, with the organic silicon compound (s), a class of highly reactive compounds that can undergo hydrolysis or oligomerization and/or polymerization when used. As a result of their high reactivity, these organic silicon compounds form a film on the keratinous material.

To avoid premature oligomerization or polymerization, it is of considerable advantage to the user to prepare the ready-to-use agent (a) only shortly before use.

In a further embodiment, preferred is a method comprising the following steps in the order indicated
(1) Preparation of an agent (a) by mixing a first agent (a') and a second agent (a"), wherein
the first agent (a') comprises at least one organic silicon compound (a1) from the group of silanes having one, two or three silicon atoms, and
the second agent (a") at least one color-imparting compound (a2) comprising at least one effect pigment comprising α) a substrate platelet comprising synthetic mica, and β) a coating comprising at least a first metal oxide (hydrate) layer,
(2) Application of the agent (a) on the keratinous material,
(3) Allowing the agent (a) to act for a period of about 10 seconds to about 10 minutes, preferably from about 10 seconds to about 5 minutes,
(4) if necessary, rinsing the keratinous material with water,
(5) Application of the agent (b) on the keratinous material,
(6) Allowing the agent (b) to act for a period of about 30 seconds to about 30 minutes, preferably from about 30 seconds to about 10 minutes,
(7) Rinse the keratinous material with water.

To be able to provide a formulation that is as stable as possible in storage, the agent (a') itself is preferably formulated to be low in water or water-free.

In a preferred embodiment, a multicomponent packaging unit (kit-of-parts) is wherein the agent (a')—based on the total weight of the agent (a')—comprises of water content from about 0.001 to about 10 wt. %, preferably from about 0.5 to about 9 wt. %, more preferably from about 1 to about 8 wt. % and very particularly preferably from about 1.5 to about 7 wt. %.

The agent (a") may contain water. In a preferred embodiment, a multicomponent packaging unit (kit-of-parts) is wherein the agent (a")—based on the total weight of the agent (a2)—has a water content of from about 15 to about 99.9 wt. %, preferably from about 35 to about 99 wt. %, more preferably from about 55 to about 99 wt. %, still more preferably from about 65 to about 99 wt. % and very particularly preferably from about 75 to about 99 wt. %. Within this embodiment, the ready-to-use agent (a) is now prepared by mixing agents (a') and (a").

For example, the user can use (a'), which comprises the organic silicon compound(s) (a1), first with the water-comprising, effect pigment-comprising agent (a") or spill it. This mixture of (a') and (a") can now be applied to the keratinous materials—either directly after its preparation or after a short reaction time of about 10 seconds to about 20 minutes. Subsequently, the user can apply the agent (b) as previously described.

The optionally included silicone polymer (a3) can be incorporated in the agent (a') or in the agent (a"). Preferably, the silicone polymer (a3) is included in the agent (a").

In a further embodiment, preferred is a method comprising the following steps in the order indicated
- (1) Preparation of an agent (a) by mixing a first agent (a') and a second agent (a"), wherein
  - the first agent (a') at least one organic silicon compound (a1) from the group of silanes with one, two or three silicon atoms and furthermore at least one silicone polymer (a3), and
  - the second agent (a") at least one colorant compound (a2) comprising at least one effect pigment comprising α) a substrate platelet comprising synthetic mica, and β) a coating comprising at least a first metal oxide (hydrate) layer,
- (2) Application of the agent (a) on the keratinous material,
- (3) Allowing the agent (a) to act for a period of 10 seconds to 10 minutes, preferably from 10 seconds to 5 minutes,
- (4) if necessary, rinsing the keratinous material with water,
- (5) Application of the agent (b) on the keratinous material,
- (6) Allowing the agent (b) to act for a period of 30 seconds to 30 minutes, preferably from 30 seconds to 10 minutes,
- (7) Rinse the keratinous material with water.

In the context of a further embodiment, particularly preferred is a method comprising the following steps in the order indicated
- (1) Preparation of an agent (a) by mixing a first agent (a') and a second agent (a"), wherein
  - the first agent (a') comprises at least one organic silicon compound (a1) from the group of silanes having one, two or three silicon atoms, and
  - the second agent (a") comprises at least one coloring compound (a2), comprising at least one effect pigment comprising α) a substrate platelet comprising synthetic mica, and β) a coating comprising at least a first metal oxide (hydrate) layer, and further comprising at least one silicone polymer (a3),
- (2) Application of the agent (a) on the keratinous material,
- (3) Allowing the agent (a) to act for a period of 10 seconds to 10 minutes, preferably from 10 seconds to 5 minutes,
- (4) if necessary, rinsing the keratinous material with water,
- (5) Application of the agent (b) on the keratinous material,
- (6) Allowing the agent (b) to act for a period of 30 seconds to 30 minutes, preferably from 30 seconds to 10 minutes,
- (7) Rinse the keratinous material with water.

In a further preferred embodiment, a process may also be wherein the silicone polymer(s) (a3) in a third, separately prepared agent (a''') are provided.

Preferred in the context of this further embodiment is a method comprising the following steps in the order indicated
- (1) Preparation of an agent (a) by mixing a first agent (a'), a second agent (a") and a third agent (a'''), wherein
  - the first agent (a') comprises at least one organic silicon compound (a1) from the group of silanes having one, two or three silicon atoms, and
  - the second agent (a") comprises at least one colorant compound (a2) comprising at least one effect pigment comprising α) a substrate platelet comprising synthetic mica, and β) a coating comprising at least a first metal oxide (hydrate) layer, and the third agent (a''') comprises at least one silicone polymer (a3),
- (2) Application of the agent (a) on the keratinous material,
- (3) Allowing the agent (a) to act for a period of 10 seconds to 10 minutes, preferably from 10 seconds to 5 minutes,
- (4) if necessary, rinsing the keratinous material with water,
- (5) Application of the agent (b) on the keratinous material,
- (6) Allowing the agent (b) to act for a period of 30 seconds to 30 minutes, preferably from 30 seconds to 10 minutes,
- (7) Rinse the keratinous material with water.

Multi-Component Packaging Unit (Kit-of-Parts)

To increase user convenience, the user is preferably provided with all the necessary means in the form of a multi-component packaging unit (kit-of-parts).

A second object of the present disclosure is therefore a multi-component packaging unit (kit-of-parts) for dyeing keratinous material, comprising separately prepared
- a first container with an agent (a'), wherein the agent (a') comprises:
- (a1) at least one organic silicon compound selected from the group of silanes having one, two or three silicon atoms, and
- a second container with an agent (a"), wherein the agent (a") comprises
- (a2) at least one colorant compound comprising at least one effect pigment comprising α) a substrate platelet comprising synthetic mica, and β) a coating comprising at least a first metal oxide (hydrate) layer, and
- a third container comprising an agent (b), the agent (b) comprising:
- (b1) at least one sealing reagent, where the components (a1), (a2) and (b1) have been disclosed in detail above.

The agent (a') of the kit from the group of silanes with one, two or three silicon atoms correspond to the organic silicon compounds (a1) which were also used in the agent (a) of the previously described process.

The agent (a") of the kit comprising colorant compounds (a2) comprising at least one effect pigment comprising α) a substrate platelet comprising synthetic mica, and β) a coating comprising at least a first metal oxide (hydrate) layer corresponding to the colorant compounds (a2) comprising an effect pigment comprising α) a substrate platelet comprising synthetic mica, and β) a coating comprising at least a first metal oxide (hydrate) layer, which were also used in agent (a) of the process described above.

The sealing reagent (b1) included in agent (b) of the kit corresponds to sealing reagent (b1) that was also used in agent (b) of the previously described method.

In this context, it is again possible to use the optionally included silicone polymer (a3)
in the agent (a'), in the agent (a") or in a further agent (a''').

In a further preferred embodiment, a multi-component kit-of-parts for dyeing keratinous material comprising separately prepared
- a first container comprising an agent (a'), wherein the agent comprises (a'):
- at least one organic silicon compound (a1) from the group of silanes with one, two or three silicon atoms and furthermore at least one silicone polymer (a3), and
- a second container comprising an agent (a"), said agent (a") comprising
- (a2) at least one colorant compound comprising at least one effect pigment comprising α) a substrate platelet comprising synthetic mica, and β) a coating comprising at least a first metal oxide (hydrate) layer, and a third container comprising an agent (b), wherein the agent comprises (b):
(b1) at least one sealing reagent,
wherein the components (a1), (a2), (a3) and (b1) have been disclosed in detail above.

In a further preferred embodiment, a multi-component kit-of-parts for dyeing keratinous material comprising separately prepared
a first container comprising an agent (a'), wherein the agent comprises (a'):
at least one organic silicon compound (a1) selected from the group of silanes having one, two or three silicon atoms, and
a second container with an agent (a"), wherein the agent comprises (a"):
(a2) at least one colorant compound comprising at least one effect pigment comprising α) a substrate platelet comprising synthetic mica, and β) a coating comprising at least a first metal oxide (hydrate) layer, and further comprising at least one silicone polymer (a3), and
a third container comprising an agent (a'''), wherein the agent (a''') is a water-comprising cosmetic carrier
a fourth container comprising agent (b), wherein the agent comprises (b):
(b1) at least one sealing reagent,
where the components (a1), (a2), (a3) and (b1) have been disclosed in detail above.

In this embodiment, agents (a') and (a") have a low water content. To prepare the ready-to-use agent (a), agents (a'), (a") and (a''') are mixed. The agent (a''') represents a water-comprising cosmetic carrier.

In this embodiment of the multicomponent packaging unit, the agent may be (a") or the agent (a''') further comprise at least one further colorant compound (a2).

In a further preferred embodiment, a multi-component kit-of-parts for dyeing keratinous material comprising separately prepared
a first container comprising an agent (a'), wherein the agent comprises (a'):
at least one organic silicon compound (a1) selected from the group of silanes having one, two or three silicon atoms,
a second container with an agent (a"), said agent comprising (a"):
(a2) at least one colorant compound comprising at least one effect pigment comprising α) a substrate platelet comprising synthetic mica, and β) a coating comprising at least a first metal oxide (hydrate) layer,
a third container comprising an agent (a'''), wherein the agent (a''') comprising: at least one silicone polymer (a3), and
a fourth container comprising an agent (b), the agent (b) comprising:
(b1) at least one sealing reagent,
wherein the components (a1), (a2), (a3) and (b1) have been disclosed in detail above.

In this embodiment of the multicomponent packaging unit, it is preferred that the agent (a''') also comprises at least one further colorant compound (a2).

Another embodiment comprises a kit-of-parts for dyeing keratinous material comprising, separately assembled,
a first container comprising an agent (a'), wherein the agent (a') comprises:
(a1) at least one organic silicon compound selected from the group of silanes having one, two or three silicon atoms, and
a second container with an agent (a"), wherein the agent (a") comprises:
(a2) at least one colorant compound comprising at least one effect pigment comprising α) a substrate platelet comprising synthetic mica, and β) a coating comprising at least a first metal oxide (hydrate) layer, and water, a third container comprising an agent (b), wherein the agent (b) comprises:
(b1) at least one sealing reagent,
wherein the components (a1), (a2) and (b1) have been disclosed in detail above.

In this embodiment of the multicomponent packaging unit, the agent may be (a") further comprise at least one further colorant compound (a2).

With respect to the further preferred embodiments of the multicomponent packaging unit mutatis mutantis what has been said about the process.

EXAMPLES

Example 1

The following formulations have been produced (unless otherwise stated is, all figures are in wt. %)
Agent (a')

| Agent (a') | Weight % |
|---|---|
| (3-Aminopropyl)triethoxysilane (a1) | 20 |
| Methyltrimethoxysilane (a1) | 70 |
| Water | ad 100 |

Agent (a")

| Agent (a") | Weight % |
|---|---|
| Timiron ® SynWhite Satin (ex Merck) (a2) | 5 |
| PEG-12 Dimethicone (a3) | 5 |
| Hydroxyethylcellulose | 1 |
| Water | ad 100 |

The ready-to-use agent (a) was prepared by mixing 5 g of the agent (a') and 20 g of the agent (a") prepared. The pH of the agent (a) was adjusted to a value of 10.5 by adding ammonia or lactic acid. Then the agent (a) was allowed to stand for about 5 minutes.
Agent (b)

| Agent (b) | Weight % |
|---|---|
| Ethylene/Sodium Acrylate Copolymer (b1) (25% solution) | 40 |
| Water | ad 100 |

The agent (a) was massaged into one strand of hair at a time (Kerling, Euronatural hair white), and left to act for 1 minute. The agent (a) was then rinsed with water.

Subsequently, agent (b) was applied to the hair strand, left to act for 1 minute and then also rinsed with water.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the various embodiments in any way. Rather, the foregoing detailed description will provide those skilled in the art with a convenient road map for implementing an exemplary embodiment as contemplated herein. It being understood that various changes may be made in the function and arrangement of elements described in an exemplary embodiment without departing from the scope of the various embodiments as set forth in the appended claims.

The invention claimed is:
1. A process for dyeing keratinous material, comprising:
applying an agent (a) to the keratinous material, wherein the agent (a) comprises:
(a1) at least one organic silicon compound of formula (I) and at least one organic silicon compound of formula (IV),

  (I), where
$R_1$, $R_2$ each independently represent a hydrogen atom or a $C_1$-$C_6$ alkyl group,
L is a linear or branched divalent $C_1$-$C_{20}$-alkylene group,
each $R_3$, $R_4$ independently represents a $C_1$-$C_6$ alkyl group,
a is an integer of from 1 to 3, and
b is the difference of 3–a:

  (IV), where
$R_9$ represents a $C_1$-$C_{18}$-alkyl group,
each $R_{10}$ independently represents a hydrogen atom or a $C_1$-$C_6$ alkyl group,
each Ru represents a $C_1$-$C_6$ alkyl group,
k is an integer of from 1 to 3, and
m is the difference of 3–k; and
(a2) at least one color-imparting compound comprising at least one effect pigment, the at least one effect pigment comprising
α) a substrate platelet comprising synthetic mica, and
β) a coating comprising at least a first metal oxide (hydrate) layer; and
applying an agent (b) to the keratinous material, wherein the agent (b) comprises:
(b1) at least one sealing reagent.
2. The process of claim 1, wherein the agent (a) comprises at least one organic silicon compound (a1) of formula (I), where:
$R_1$, $R_2$ each represent a hydrogen atom,
L is a linear divalent $C_1$-$C_6$ alkylene group,
each $R_3$, $R_4$ independently represents a methyl group or an ethyl group,
a is 3, and
b is 0.
3. The process of claim 2, wherein the at least one organic silicon compound (a1) of formula (I) is selected from the group of (3-aminopropyl)triethoxysilane, (3-aminopropyl)trimethoxysilane, 1-(3-aminopropyl)silanetriol, (2-aminoethyl)triethoxysilane, (2-aminoethyl)trimethoxysilane, 1-(2-aminoethyl)silanetriol, (3-dimethylaminopropyl)triethoxysilane, (3-dimethylaminopropyl)trimethoxysilane, 1-(3-dimethylaminopropyl)silanetriol, (2-dimethylaminoethyl)triethoxysilane,(2-dimethylaminoethyl)trimethoxysilane, 1-(2-dimethylaminoethyl)silanetriol, and combinations thereof.
4. The process of claim 1, wherein at least one organic silicon compound (a1) of formula (IV) is selected from the group of methyltrimethoxysilane, methyltriethoxysilane ethyltrimethoxysilane ethyltriethoxysilane, propyltrimethoxysilane, propyltriethoxysilane, hexyltrimethoxysilane, hexyltriethoxysilane, octyltrimethoxysilane, octyltriethoxysilane, dodecyltrimethoxysilane, dodecyltriethoxysilane, octadecyltrimethoxysilane, octadecyltriethoxysilane, and combinations thereof.

5. The process of claim 1, wherein the sealing reagent (b1) comprises a compound selected from the group of film forming polymers, alkalizing agents, acidifying agents, and combinations thereof.
6. The process of claim 1, wherein the first metal oxide (hydrate) layer of the coating β) comprises titanium dioxide ($TiO_2$).
7. The process of claim 1, wherein the coating β) further comprises a second metal oxide (hydrate) layer.
8. The process of claim 7, wherein the second metal oxide (hydrate) layer comprises a metal oxide (hydrate) selected from the group of tin oxide ($SnO_2$), silicon oxide ($SiO_2$), aluminum oxide ($Al_2O_3$), iron oxides ($Fe_2O_3$ and/or $Fe_3O_4$), and combinations thereof.
9. The process of claim 7, wherein the second metal oxide (hydrate) layer comprises tin oxide ($SnO_2$).
10. The process of claim 1, wherein the agent (a) comprises at least one color-imparting compound (a2) selected from the group of colored metal oxides, metal hydroxides, metal oxide hydrates, silicates, metal sulfides, complex metal cyanides, metal sulfates, bronze pigments, colored pigments based on natural mica coated with at least one metal oxide and/or a metal oxychloride, and combinations thereof.
11. The process of claim 1, wherein the agent (a) is applied in a first step and the agent (b) is applied in a second step.
12. The process of claim 11, wherein:
the at least one organic silicon compound (a1) of formula (I) is selected from the group of (3-aminopropyl)triethoxysilane, (3-aminopropyl)trimethoxysilane, 1-(3-aminopropyl)silanetriol, (2-aminoethyl)triethoxysilane, (2-aminoethyl)trimethoxysilane, 1-(2-aminoethyl)silanetriol, (3-dimethylaminopropyl)triethoxysilane, (3-dimethylaminopropyl)trimethoxysilane, 1-(3-dimethylaminopropyl)silanetriol,
(2-dimethylaminoethyl)triethoxysilane,(2-dimethylaminoethyl)trimethoxysilane, 1-(2-dimethylaminoethyl)silanetriol, and combinations thereof;
the at least one organic silicon compound (a1) of formula (IV) is selected from the group of methyltrimethoxysilane, methyltriethoxysilane ethyltrimethoxysilane ethyltriethoxysilane, propyltrimethoxysilane, propyltriethoxysilane, hexyltrimethoxysilane, hexyltriethoxysilane, octyltrimethoxysilane, octyltriethoxysilane, dodecyltrimethoxysilane, dodecyltriethoxysilane, octadecyltrimethoxysilane, octadecyltriethoxysilane, and combinations thereof, and
the first metal oxide (hydrate) layer of the coating β) comprises titanium dioxide ($TiO_2$).
13. The process of claim 12, wherein the sealing reagent is a film-forming polymer selected from the group of homopolymers and copolymers of acrylic acid, homopolymers and copolymers of methacrylic acid, homopolymers and copolymers of acrylic acid esters, homopolymers and copolymers of methacrylic acid esters, homopolymers and copolymers of acrylic acid amides, homopolymers and copolymers of methacrylic acid amides, homopolymers and copolymers of vinylpyrrolidone, homopolymers and copolymers of vinyl alcohol, homopolymers and copolymers of vinyl acetate, homopolymers and copolymers of ethylene, homopolymers and copolymers of propylene, homopolymers and copolymers of styrene, polyurethanes, polyesters and polyamides.

14. The process of claim 13, wherein:
the at least one organic silicon compound of formula (I) is (3-aminopropyl)triethoxysilane;
the at least one organic silicon compound of formula (IV) is methyltriethoxysilane;
the coating β) further comprises a second metal oxide (hydrate) layer comprising tin oxide ($SnO_2$); and
the film-forming polymer is selected from acrylates/octylacrylamides copolymers, ethylene/sodium acrylic copolymer, or combinations thereof.

* * * * *